(12) United States Patent
Song

(10) Patent No.: US 10,214,846 B2
(45) Date of Patent: *Feb. 26, 2019

(54) WASHING MACHINE DRIVING DEVICE, WASHING MACHINE HAVING SAME, AND CONTROL METHOD THEREFOR

(71) Applicant: AMOTECH CO., LTD., Incheon (KR)

(72) Inventor: Duck Hyun Song, Ansan-si (KR)

(73) Assignee: AMOTECH CO., LTD., Incheon (KR)

( * ) Notice: Subject to any disclaimer, the term of this patent is extended or adjusted under 35 U.S.C. 154(b) by 245 days.

This patent is subject to a terminal disclaimer.

(21) Appl. No.: 14/982,571

(22) Filed: Dec. 29, 2015

(65) Prior Publication Data

US 2016/0130739 A1 May 12, 2016

Related U.S. Application Data

(62) Division of application No. PCT/KR2014/006336, filed on Jul. 14, 2014.

(30) Foreign Application Priority Data

Jul. 12, 2013 (KR) .................. 10-2013-0082063
Jul. 14, 2014 (KR) .................. 10-2014-0088494

(51) Int. Cl.
| | |
|---|---|
| H02K 7/116 | (2006.01) |
| D06F 37/40 | (2006.01) |
| D06F 37/30 | (2006.01) |
| H02K 16/02 | (2006.01) |

(52) U.S. Cl.
CPC ........... *D06F 37/304* (2013.01); *D06F 37/40* (2013.01); *H02K 7/116* (2013.01); *H02K 16/02* (2013.01)

(58) Field of Classification Search
CPC .............................. D06F 37/304; D06F 37/40
See application file for complete search history.

(56) References Cited

FOREIGN PATENT DOCUMENTS

| CN | 102877269 A | * | 1/2013 |
|---|---|---|---|
| KR | 20030077682 | | 10/2003 |
| KR | 100434192 | | 7/2004 |
| KR | 20050016733 | | 2/2005 |

(Continued)

OTHER PUBLICATIONS

Machine Translation of CN102877269A (Year: 2013).*
International Search Report—PCT/KR2014/006336 dated Oct. 27, 2014.

*Primary Examiner* — Spencer E Bell
(74) *Attorney, Agent, or Firm* — Cantor Colburn LLP

(57) ABSTRACT

An apparatus for driving a washing machine in which a washing tub and a pulsator are driven separately to thereby form a variety of washing water flows includes: an outer shaft whose one end is connected to a washing tub; an inner shaft whose one end is connected to a pulsator; a planetary gear set that decelerates a rotational speed that is transferred via the inner shaft; first and second bearings that rotatably support the planetary gear set in two-way directions; and a washing machine motor for applying a rotational force to each of the outer shaft and the inner shaft. The washing machine motor includes: an outer rotor; an inner rotor; and a double stator that rotatably drives the outer rotor and the inner rotor independently, in which the output of the pulsator is accelerated or decelerated depending on the direction of rotation of the outer rotor.

2 Claims, 14 Drawing Sheets

(56) References Cited

FOREIGN PATENT DOCUMENTS

| KR | 100548310 | 2/2006 |
|----|-----------|--------|
| KR | 1020060020266 | 3/2006 |
| KR | 100925428 | 11/2009 |
| KR | 101140924 | 5/2012 |
| KR | 20130074151 | 7/2013 |

* cited by examiner

WASHING MACHINE DRIVING DEVICE, WASHING MACHINE HAVING SAME, AND CONTROL METHOD THEREFOR

TECHNICAL FIELD

The present invention relates to an apparatus for driving a washing machine in which a washing tub and a pulsator are driven separately to thereby form a variety of laundry and washing water flows, a washing machine using the same, and a controlling method thereof.

BACKGROUND ART

A conventional combination dehydration full-automatic washing machine is configured to include a rotating tub rotatably installed in an outer tub as a combination dehydration tub and washing tub, and further include a pulsator rotatably mounted on the bottom portion of the rotating tub. Since the pulsator and the rotating tub are rotatably driven by a single drive motor, rotation of the drive motor is transferred to the pulsator in a state where the rotating tub is braked and stopped, to thus make the pulsator driven in forward and reverse rotation modes at a relatively low speed, when running a washing operation. Meanwhile, when running a dehydration operation, braking of the rotating tub is released and rotation of the drive motor is transferred to the rotating tub and the pulsator without deceleration, to thereby rotationally drive the rotating tub and the pulsator.

A clutch structure and a reduction gear mechanism are needed along a rotating force (or torque) transmission path from the drive motor to the rotating tub and the pulsator in order to switch the rotating force transmission path. For this reason, the conventional combination dehydration full-automatic washing machine has quite a complex configuration to thus cause poor manufacturability and assembly performance and to resultantly increase manufacturing cost. In addition, a control circuit transmission path switching operation does not work in progress due to the poor manufacturing accuracy and deterioration over time of the clutch mechanism to thereby cause unstable switching reliability in some cases.

Moreover, during performing a switching operation from a washing operation to a dehydration operation, there is a noise problem caused by a switching operation sound of the clutch mechanism or an operation sound generated from the reduction mechanism. In addition, there is a problem that a long laundry time is taken due to a prolonged switching operation of the clutch mechanism.

Theconventional full-automatic washing machine has been proposed in Korean Patent Application Publication No. 10-2003-0077682 (hereinafter, referred to as Patent Document 1), and includes: a dehydration tub that is rotatably mounted in an outer tub; a pulsator that is installed in the dehydration tub, and is independently rotatable from the dehydration tub; a dehydration shaft that is supported rotatably in a shaft support bearing case, and transmits the rotational power to the dehydration tub; a washing shaft that transmits the rotational power to the pulsator; a BLDC (BrushLess Direct-Current) motor in which a rotor rotates as current is supplied for a stator; and a switchable clutch mechanism that can switch a power transmission path of a motor to the washing shaft or the dehydration shaft in correspondence to a washing stroke or dehydrating stroke.

Patent Document 1 has disclosed a control method of the full-automatic washing machine, in which an operation of switching the BLDC motor to the left and right directions is performed in order to cancel locking of a coupling prior to a step of raising the coupling up to a washing mode position by turning on a clutch motor after completion of supplying water for washing, and serration of the inner circumferential surface of the coupling receives a surface pressure acting in the opposite direction to each other from serration of a lower end of the dehydration shaft and serration of an upper end of an inner connector by a mismatch of the dehydration shaft and the inner connector that are coupled to the coupling, to thus prevent a phenomenon of constraining an ascending of the coupling upon drive of the clutch motor.

The above-described conventional full-automatic washing machine is provided with a clutch motor to ensure that power is selectively transmitted to the washing shaft and the dehydration shaft, to accordingly cause a problem that the dehydration tub and pulsator cannot be driven independently and thus a variety of water flows cannot be formed.

In addition, in Patent Document 1, since the washing stroke of low-speed and high-torque characteristics and the dehydration stroke of high-speed and low-torque characteristics should be performed by using a single drive motor, a motor design cannot be optimized for any one stroke of the washing machine. As a result, a high-speed rotation problem that can be caused during the dehydration stroke can be solved by designing a motor somewhat optimized for the washing stroke and conducting a so-called field-weakening control during the dehydration stroke, but there is a problem accompanying a complex control.

In order to solve the problems of Patent Document 1 requiring the high-torque in the washing stroke and the field-weakening control in the dehydration stroke, Korean Patent Registration No. 10-0548310 (hereinafter, referred to as Patent Document 2) including a planetary gear set and a clutch mechanism has been proposed.

The conventional washing machine disclosed in Patent Document 2 includes: an outer case forming an outer shape; an outer tub which is supported on an inside of the outer case for receiving wash water therein; an inner tub which is rotatably accommodated in an inside of the outer tub and is used for both washing and dehydrating; a pulsator which is mounted in an inside of the inner tub relatively rotatably, to form a washing water flow; a drive motor for generating a driving force for rotating the inner tub and the pulsator; an inner tub rotating shaft which receives the driving force of the drive motor for rotating the inner tub; a pulsator rotating shaft which receives the driving force of the drive motor for rotating the pulsator; a sun gear which is connected to the drive motor and is connected to the pulsator rotating shaft; a plurality of planetary gears which are simultaneously engaged with the sun gear and a ring gear; a carrier supporting the planetary gears so as to be rotated and revolved; and a clutch spring for controlling the rotation of the inner tub and the pulsator during washing or dehydrating.

The conventional washing machine of Patent Document 2 has a planetary gear set including the sun gear, the ring gear, the planetary gears and the carrier, and reduces the rotating force of the drive motor, to then be transferred to the pulsator and the inner tub, and operates a clutch spring to selectively transmit power to the pulsator and the inner tub, to thus rotate only the pulsator during washing and both the pulsator and the inner tub simultaneously during dehydrating.

However, the conventional washing machine having the planetary gear set as in Patent Document 2 has a structure of rotating the pulsator and the inner tub only in an identical direction since the planetary gear set is supported by a one-way bearing, and thus cannot rotate the pulsator and the inner tub in directions opposed to each other. In addition, the conventional washing machine having the planetary gear set as in Patent Document 2 employs a single drive motor and causes a problem of failing dual power implementation.

In order to solve the above-described defects of Patent Document 2, a dehydration combined washing machine disclosed in Korean Patent Application Publication No. 10-1999-0076570 (hereinafter, referred to as Patent Document 3) includes: an outer box; an outer tub that is resiliently supported via a plurality of elastic hanging mechanism in the outer box; a rotating tub serving as a washing tub and a dehydration tub that are rotatably disposed within the outer tub; a pulsator that is installed in the rotating tub; a washing motor that is installed to directly drive the pulsator and that is controlled at a variable speed; and a dehydrating motor that is installed to directly drive the rotating tub and that is controlled at a variable speed, wherein a rotor of the washing motor is rotatably attached to the pulsator at a lower end of a rotation shaft of the pulsator, and a rotor of the dehydrating motor is rotatably attached to and integrated with the rotating tub at a lower end of a rotation shaft of the rotating tub.

In the washing machine of Patent Document 3, the washing motor is constructed into an outer rotor type with a larger diameter than that of the dehydrating motor, and the dehydrating motor is composed of an inner rotor type, in a manner that the washing motor has low-speed and high-torque motor characteristics, and the dehydrating motor has higher-speed and lower-torque motor characteristics than those of the washing motor, to thereby have a positional relationship between the washing motor and the dehydrating motor where the washing motor is located at an outer side and the dehydrating motor is located at an inner side.

In the washing machine of Patent Document 3, the washing motor is constructed into the outer rotor type with a larger diameter than that of the dehydrating motor, but has a problem of having an insufficient drive torque to handle a large capacity laundry in a large-capacity washing machine.

In addition, in the washing machine of Patent Document 3, only the washing motor is made to rotate in a forward or reverse direction at a predetermined rotating speed, or the washing motor is made to rotate in a forward direction and the dehydrating motor is made to rotate in a reverse direction, at a state where the rotating tub is sopped by DC exciting the dehydrating motor during a washing stroke to then be set to be in a braking mode, and accordingly the rotating tub is in a substantially stationary state without rotating in an opposite direction by and against a load such as a quantity of laundry and an amount of water to thus achieve to prevent idling.

Moreover, the washing machine of Patent Document 3 has proposed a structure of using two drive motors although a start-up torque of the rotating tub makes a greater action than that of the pulsator in consideration of the heavyweight rotating tub and a load such as a large capacity of a quantity of laundry and an amount of water, wherein the pulsator is driven by the washing motor that is constructed into an outer rotor type with a larger diameter than that of the dehydrating motor and is located at an outer-more side than the dehydrating motor, to have low-speed and high-torque motor characteristics. As a result, the washing machine of Patent Document 3 drives the pulsator and the rotating tub in mutual reverse directions to thus cause a problem of failing to implement a strong flow of water for washing.

Thus, the washing machine of Patent Document 3 has disclosed a structure of independently driving the pulsator and the rotating tub by using two drive motors, but does not propose a variety of types of flows of water for washing using the same.

SUMMARY OF THE INVENTION

To solve the above problems or defects, it is an object of the present invention to provide an apparatus for driving a washing machine, the apparatus employing a washing machine motor of a double rotor-double stator structure to thereby independently drive a pulsator and a washing tub, respectively, and converting a rotating force of a rotor into a torque and transmitting the torque to the pulsator to thereby implement a high-torque start of the pulsator to then be appropriate for a large-capacity washing machine, and a washing machine having the washing machine driving apparatus.

It is still another object of the present invention to provide a washing machine independently driving a pulsator and a washing tub, respectively, and setting a planetary gear set in two-way directions to then be set to be in a rotatable state, to thereby enable dual-power and mono-power implementations and form a variety of water flow patterns during a washing stroke, and a control method thereof.

It is yet another object of the present invention to provide an apparatus for driving a washing machine, the apparatus employing a washing machine motor of a double rotor-double stator structure wherein a washing tub requiring a larger starting torque is driven with an output of an outer rotor having a high-torque characteristic and a pulsator requiring a relatively small starting torque is driven with an output of an inner rotor, when independently driving the pulsator and a washing tub, respectively, and a washing machine having the washing machine driving apparatus.

It is still yet another object of the present invention to provide a washing machine employing a washing machine motor wherein a washing tub requiring a larger starting torque is driven with an output of an outer rotor having a high-torque characteristic and a pulsator requiring a relatively small starting torque is driven with an output of an inner rotor, to thus independently drive the pulsator and the washing tub, respectively, and to thereby enable dual-power and mono-power implementations and form a variety of strong water flow patterns during a washing stroke, and a control method thereof.

It is a further object of the present invention to provide a control method for a washing machine in which directions of rotation and rotational speeds of a pulsator and a washing tub are independently controlled, respectively, to thus form a variety of water flow patterns, improve a cleaning capability, improve fabric loose performance, prevent fabric tangling, enable rhythm washability, and control the water flow intensity.

It is a still further object of the present invention to provide a control method for a washing machine in which one having a larger starting torque of a pulsator and a washing tub is started earlier than the other thereof and is rotatably driven in one direction, when the pulsator and the washing tub are driven in the opposite directions to each other, and then the other having a smaller starting torque thereof is rotated in the same direction as that of the one having a larger starting torque, to then reversely rotate the one having a larger starting torque to thereby achieve the opposite drive directions of the pulsator and the washing tub, in a washing or rinsing process.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided an apparatus for driving a washing machine, the washing machine driving apparatus comprising: an outer shaft whose one end is connected to a washing tub; an inner shaft whose one end is connected to a pulsator; a planetary gear set that is installed in the pulsator and washing tub through the outer shaft and the inner shaft, and that decelerates a rotational speed that is transferred via the inner shaft; first and second bearings that are provided at the outer shaft and that rotatably support the planetary gear set in two-way directions; and a washing machine motor for applying a rotational force to each of the outer shaft and the inner shaft, wherein the washing machine motor comprises: an outer rotor that is connected to the outer shaft; an inner rotor that is connected to the inner shaft; and a double stator having first and second coils so as to rotatably drive the outer rotor and the inner rotor independently, and wherein the output of the pulsator is accelerated or decelerated depending on the direction of rotation of the outer rotor.

Preferably but not necessarily, the output of the pulsator is caused to decelerate when the direction of rotation of the outer rotor is the same as the direction of rotation of the inner rotor, and the output of the pulsator is caused to accelerate when the direction of rotation of the outer rotor is opposite to the direction of rotation of the inner rotor.

Preferably but not necessarily, the washing machine driving apparatus further includes a control device that applies a first drive signal and a second drive signal to a first coil and a second coil independently, wherein the control device comprises: a first driver that controls the first drive signal applied to the first coil; a second driver that controls the second drive signal applied to the second coil; and a control unit for controlling the first driver and the second driver, and wherein the control device detects a rotational speed of a ring gear of the planetary gear set to thereby control a rotational speed of the pulsator.

Preferably but not necessarily, the inner shaft comprises: a first inner shaft connected to the inner rotor; and a second inner shaft connected to the pulsator, and the outer shaft comprises: a first outer shaft connected to the outer rotor; and a second outer shaft connected to the washing tub.

Preferably but not necessarily, the planetary gear set comprises: a ring gear connecting between the first outer shaft and the second outer shaft; a sun gear coupled to the first inner shaft; a planetary gear engaged with an outer surface of the sun gear and an inner surface of the ring gear; and a carrier to which the planetary gear is rotatably supported and that is connected to the second inner shaft.

Preferably but not necessarily, one having a larger starting torque of a pulsator and a washing tub is started earlier than the other thereof and is rotated and driven in one direction, when the pulsator and the washing tub are driven in the opposite directions to each other, and then the other having a smaller starting torque thereof is rotated in the same direction as that of the one having a larger starting torque, to then reversely rotate the one having a larger starting torque to thereby achieve the opposite drive directions of the pulsator and the washing tub, in a washing or rinsing process.

Preferably but not necessarily, one having a larger starting torque of a pulsator and a washing tub is started earlier than the other thereof and is rotatably driven in one direction, when the pulsator and the washing tub are driven in an identical direction to each other, and then the other having a smaller starting torque thereof is rotated in the same direction as that of the one having a larger starting torque, in a washing or rinsing process.

According to another aspect of the present invention, there is provided an apparatus for driving a washing machine, the washing machine driving apparatus comprising: an outer shaft whose one end is connected to a washing tub; an inner shaft whose one end is connected to a pulsator; a planetary gear set that is installed in the pulsator and washing tub through the outer shaft and the inner shaft, and that decelerates a rotational speed that is transferred via the inner shaft; first and second bearings that are provided at the outer shaft and that rotatably support the planetary gear set in two-way directions; and a washing machine motor for applying a rotational force to each of the outer shaft and the inner shaft, wherein the washing machine motor comprises: an inner rotor that is connected to the outer shaft; an outer rotor that is connected to the inner shaft; and a double stator that rotatably drives the outer rotor and the inner rotor independently, and wherein the output of the pulsator is accelerated or decelerated depending on the direction of rotation of the inner rotor.

Preferably but not necessarily, one having a larger starting torque of a pulsator and a washing tub is started earlier than the other thereof and is rotatably driven in one direction, when the pulsator and the washing tub are driven in an identical direction to each other, and then the other having a smaller starting torque thereof is rotated in the same direction as that of the one having a larger starting torque, in a washing or rinsing process.

According to another aspect of the present invention, there is provided a washing machine comprising: a washing tub that is connected with an outer shaft; a pulsator that is connected with an inner shaft; a planetary gear set that is installed in the pulsator and washing tub through the outer shaft and the inner shaft, and that decelerates a rotational speed that is transferred via the inner shaft; first and second bearings that are provided at the outer shaft and that rotatably support the planetary gear set in two-way directions; and a washing machine motor of a double rotor-double stator structure for applying a rotational force to each of the outer shaft and the inner shaft, wherein the output of the pulsator is accelerated or decelerated depending on the direction of rotation of an outer rotor or an inner rotor of the washing machine motor.

Preferably but not necessarily, the washing machine motor comprises: an outer rotor that is connected to the outer shaft; an inner rotor that is connected to the inner shaft; and a double stator having first and second coils so as to rotatably drive the outer rotor and the inner rotor independently.

Preferably but not necessarily, the washing machine motor comprises: an inner rotor that is connected to the outer shaft; an outer rotor that is connected to the inner shaft; and a double stator that rotatably drives the outer rotor and the inner rotor independently.

Preferably but not necessarily, the output of the pulsator is caused to decelerate when the direction of rotation of the outer rotor is the same as the direction of rotation of the inner rotor, and the output of the pulsator is caused to accelerate when the direction of rotation of the outer rotor is opposite to the direction of rotation of the inner rotor.

According to another aspect of the present invention, there is provided a method of controlling a washing machine comprising a washing stroke, a rinsing stroke, and a dehydration stroke, wherein the washing machine comprises: a washing tub that is connected with an outer shaft; a pulsator that is connected with an inner shaft; and a washing machine motor of a double rotor-double stator structure for applying a rotational force to each of the outer shaft and the inner shaft, wherein the washing stroke comprises a step of forming a wash water flow by using the pulsator and the washing tub, and wherein the output of the pulsator is accelerated or decelerated depending on the direction of rotation of an outer rotor or an inner rotor of the washing machine motor.

Preferably but not necessarily, the step of forming a wash water flow comprises driving the pulsator and the washing tub in different directions and at different speeds, so as to form a strong water flow in a pattern form.

Preferably but not necessarily, the step of forming a wash water flow comprises driving the pulsator and the washing tub in different directions and at an identical speed, so as to form a strong water flow to improve a cleaning capability, and comprises driving the pulsator and the washing tub in variable speeds, so as to form a rhythm water flow.

Preferably but not necessarily, the step of forming a wash water flow comprises driving the pulsator, so as to form a rotating water flow while rising and falling, and driving the pulsator and the washing tub in an identical direction and at different speeds, so as to form a vortex to prevent damage to laundry.

Preferably but not necessarily, the step of forming a wash water flow comprises driving the washing tub to thus form a fabric tangling preventive water flow.

Preferably but not necessarily, the step of forming a wash water flow comprises: rotating the pulsator in one direction by rotating the inner rotor in one direction; rotating the washing tub in one direction by rotating the outer rotor in one direction when the pulsator rotates at a preset speed; and rotating the pulsator in the opposite direction by rotating the inner rotor in the opposite direction in a state in which the washing tub is rotated in one direction, and wherein the pulsator having a larger starting torque is rotated in a rotating direction desired to rotate the washing tub.

Preferably but not necessarily, the step of forming a wash water flow comprises: starting one having a larger starting torque of a pulsator and a washing tub earlier than the other thereof to then be rotatably driven in one direction, when the pulsator and the washing tub are driven in an identical direction to each other; and rotating the other having a smaller starting torque thereof in the same direction as that of the one having a larger starting torque, in a washing or rinsing process.

Preferably but not necessarily, the washing machine further comprises: a planetary gear set that is installed in the pulsator and washing tub through the outer shaft and the inner shaft, and that decelerates a rotational speed that is transferred via the inner shaft; and first and second bearings that are provided at the outer shaft and that rotatably support the planetary gear set in two-way directions, and wherein a rotational force of the outer rotor is transferred to the washing tub by the planetary gear set when the pulsator is loaded during an initial starting of the outer rotor, to thereby reduce a starting current.

According to another aspect of the present invention, there is provided a method of controlling a washing machine, the method comprising: rotating a pulsator in one direction by rotating an inner rotor in one direction; rotating a washing tub in one direction by rotating an outer rotor in one direction when the pulsator rotates at a preset speed; and rotating the pulsator in the opposite direction by rotating an inner rotor in the opposite direction in a state in which the washing tub is rotated in one direction, wherein the pulsator having a larger starting torque is rotated in a rotating direction desired to rotate the washing tub.

As described above, the present invention provides an apparatus for driving a washing machine, the apparatus employing a washing machine motor of a double rotor-double stator structure to thereby independently drive a pulsator and a washing tub, respectively, and to thus remove an existing clutch mechanism to thereby simplify a structure, and the apparatus converting a rotating force of a rotor into a torque and transmitting the torque to the pulsator to thereby implement a high-torque start of the pulsator to then be appropriate for a large-capacity washing machine, and a washing machine having the washing machine driving apparatus.

In addition, the present invention is configured to independently drive a pulsator and a washing tub, respectively, and to set a planetary gear set in two-way directions to then be set to be in a rotatable state, to thereby enable dual-power and mono-power implementations and form a variety of water flow patterns during a washing stroke.

Further, the present invention is configured to employ a washing machine motor of a double rotor-double stator structure wherein a washing tub requiring a larger starting torque is driven with an output of an outer rotor having a high-torque characteristic and a pulsator requiring a relatively small starting torque is driven with an output of an inner rotor, when independently driving the pulsator and a washing tub, respectively, to accordingly drive the pulsator and the washing tub in a washing or rinsing stroke, to thus form a variety of water flow patterns.

The present invention is configured to employ a washing machine motor wherein a washing tub is driven with an output of an outer rotor having a high-torque characteristic and a pulsator is driven with an output of an inner rotor, to thus independently drive the pulsator and the washing tub, respectively, and to thereby enable dual-power and mono-power implementations and form a variety of strong water flow patterns during a washing stroke.

The present invention is configured to independently control directions of rotation and rotational speeds of a pulsator and a washing tub, respectively, to thus form a variety of water flow patterns, improve a cleaning capability, improve fabric loose performance, prevent fabric tangling, enable rhythm washability, and control the water flow intensity.

The present invention is configured to start one having a larger starting torque of a pulsator and a washing tub earlier than the other thereof to then be rotatably driven in one direction, when the pulsator and the washing tub are driven in the opposite directions to each other, and then to rotate the other having a smaller starting torque thereof in the same direction as that of the one having a larger starting torque, to then reversely rotate the one having a larger starting torque to thereby achieve the opposite drive directions of the pulsator and the washing tub, in a washing or rinsing process, and achieve smooth start by employing a driving method using such an inertial force.

DETAILED DESCRIPTION OF THE INVENTION

Figure 1:
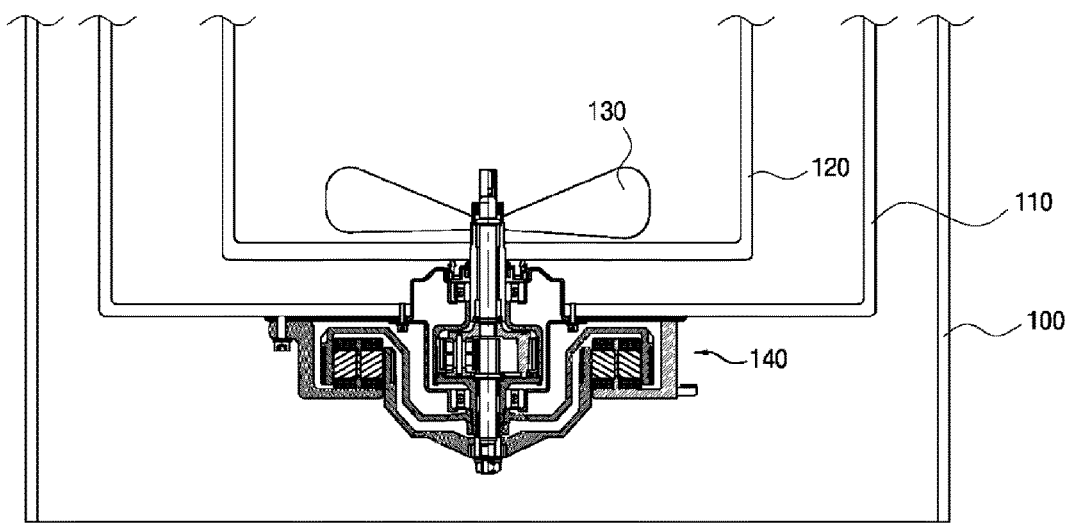
FIG. 1 is an axial cross-sectional view of a washing machine according to a first embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms can be changed according to user's or operator's intention, or the custom. Definitions of these terms herein need to be made based on the contents across the whole application.

Figure 2:
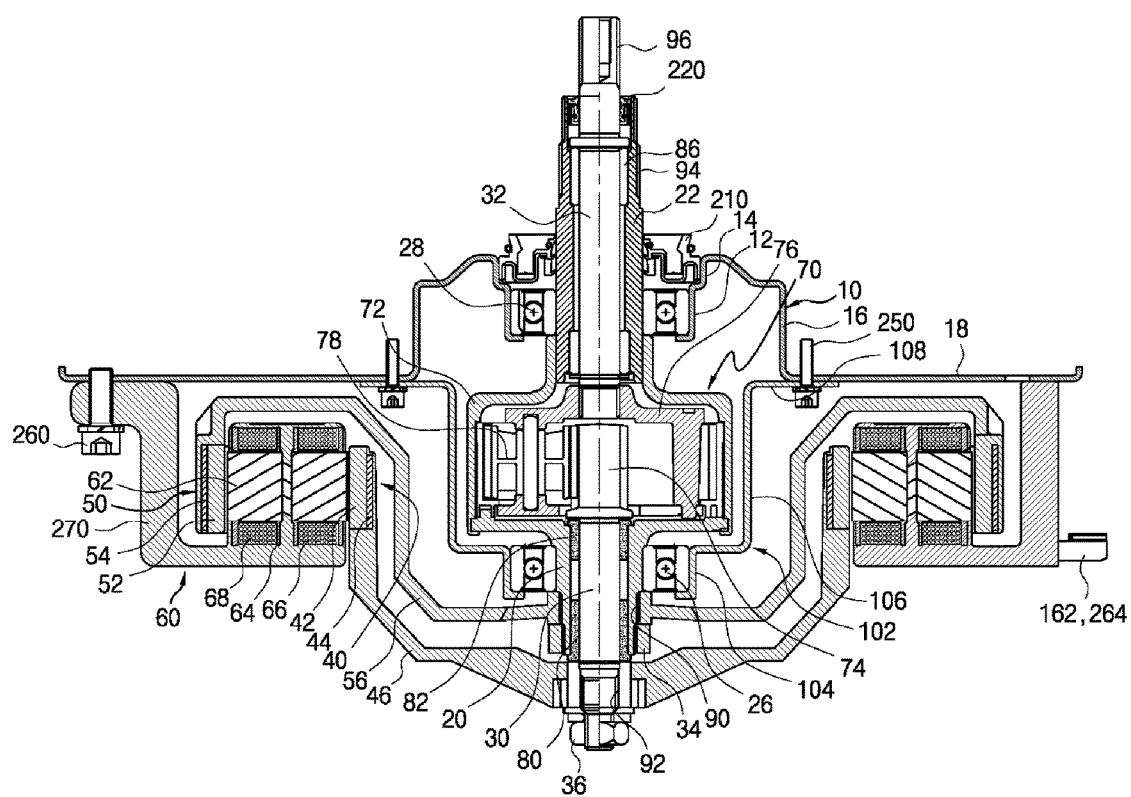
FIG. 2 is an axial cross-sectional view of a washing machine motor according to the first embodiment of the present invention.

FIG. 1 is an axial cross-sectional view of a washing machine according to a first embodiment of the present invention, and FIG. 2 is an axial cross-sectional view of a washing machine motor according to the first embodiment of the present invention.

Referring to FIGS. 1 and 2, a washing machine according to the first embodiment of the present invention includes: a case 100 forming an outer appearance; an outer tub 110 which is disposed in an inside of the case 100 for receiving washing water; a washing tub 120 which is rotatably disposed inside the outer tub 110 to perform washing and dehydrating; a pulsator 130 which is rotatably disposed on the bottom of the washing tub 120 to form a washing water flow; and a washing machine motor 140 which is mounted on a lower portion of the washing tub 120, to drive the washing tub 120 and the pulsator 130 simultaneously or selectively.

As shown in FIG. 2, the washing machine motor 140 includes: an outer rotor 50 connected to outer shafts 20 and 22; an inner rotor 40 connected to inner shafts 30 and 32; and a stator 60 arranged with an air gap between the inner rotor 40 and the outer rotor 50 to thus rotatably drive the inner rotor 40 and outer rotor 50.

The washing machine motor 140 transmits a rotational force to the washing tub 120 and the pulsator 130, via the outer shafts 20 and 22 connected to the washing tub 120 and the inner shafts 30 and 32 rotatably arranged inside of the outer shafts 20 and 22 and connected to the pulsator 130.

Any one of the inner shafts 30 and 32 and the outer shafts 20 and 22 can decelerate the rotational speed to thus increase torque.

In the first embodiment, a planetary gear set 70 is mounted on the inner shafts 30 and 32 and increases the torque by accelerating the rotational speed of the inner shafts 30 and 32, to then transfer the increased torque 130 to the pulsator 130.

The outer shafts 20 and 22 are formed in a cylindrical shape so that the inner shafts 30 and 32 pass through the outer shafts 20 and 22, respectively, and include a first outer shaft 20 coupled to the outer rotor 50, and a second outer shaft 22 coupled to the washing tub 120.

Then, the inner shafts 30 and 32 include a first inner shaft 30 coupled to the inner rotor 40 and a second inner shaft 32 coupled to the pulsator 130.

Figure 3:
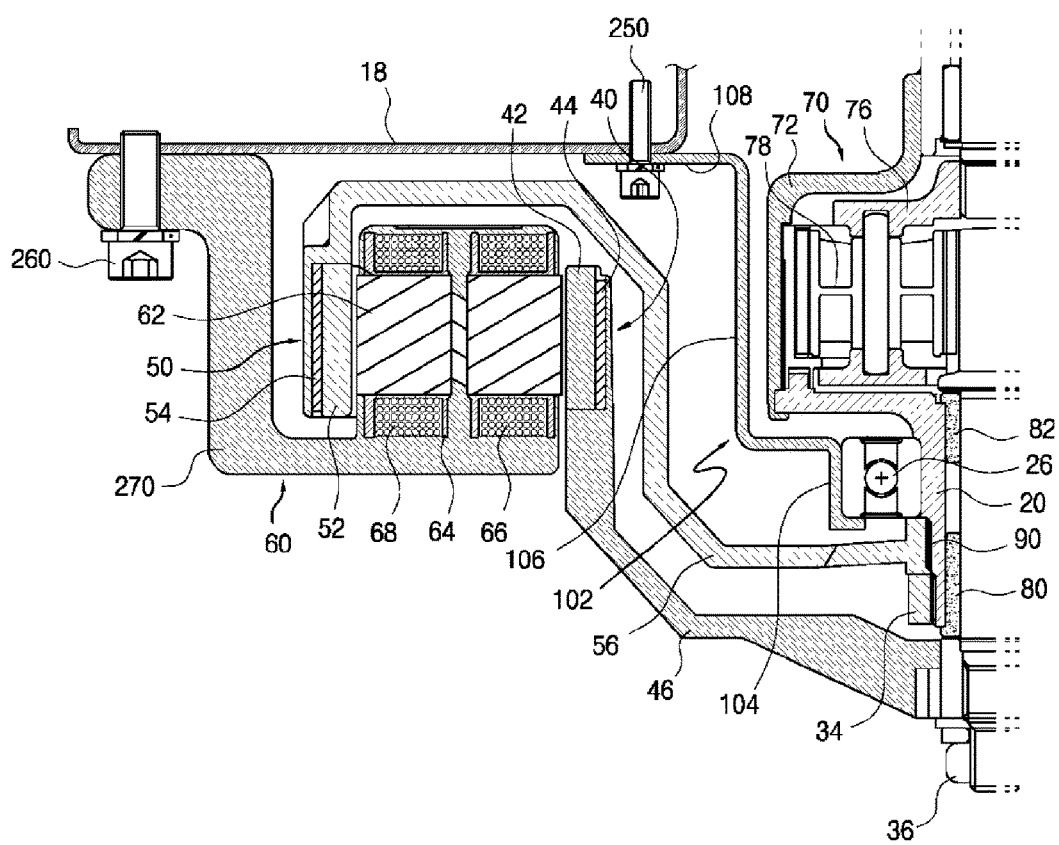
FIG. 3 is an enlarged cross-sectional view of the washing machine motor according to the first embodiment of the present invention.
Figure 4:
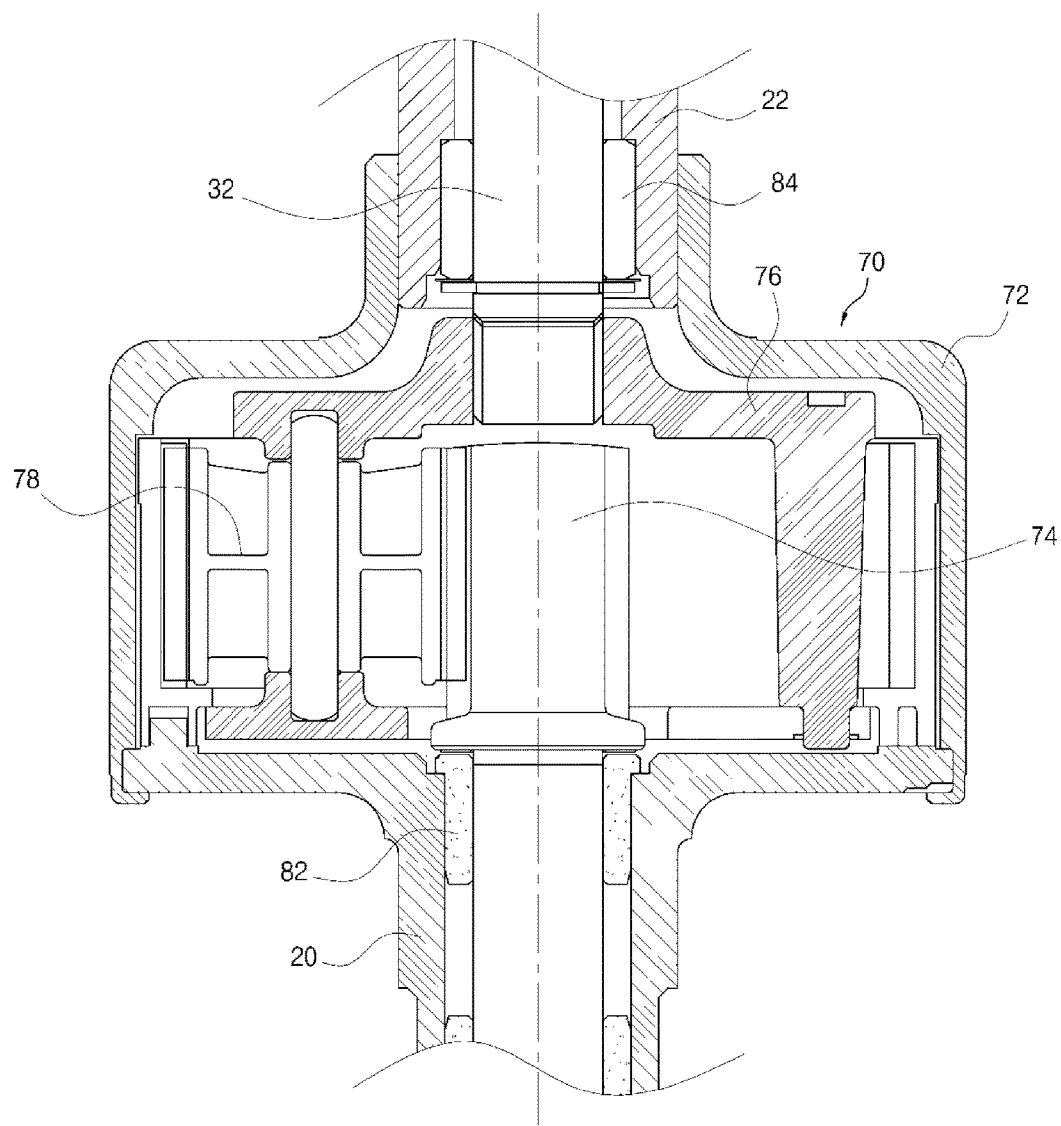
FIG. 4 is an enlarged cross-sectional view of a planetary gear according to the first embodiment of the present invention.

As shown in FIGS. 3 and 4, the planetary gear set 70 includes: a ring gear 72 connecting between the first outer shaft 20 and the second outer shaft 22; a sun gear 74 integrally coupled to the first inner shaft 30; a plurality of planetary gears 78 engaged with an outer surface of the sun gear 74 and an inner surface of the ring gear 72; and a carrier 76 to which the plurality of planetary gears 78 are rotatably supported and that is connected to the second inner shaft 32.

The planetary gear set 70 is configured so that the first outer shaft 20 and the second outer shaft 22 is connected by the ring gear 72 and thus the rotational speed of the first outer shaft 20 is transferred to the second outer shaft 22. Therefore, the rotating speed of the first outer shaft 20 is the same as that of the second outer shaft 22.

In addition, the first inner shaft 30 is formed integrally with the sun gear 74 in the inside of the planetary gear set 70, and the second inner shaft 32 is spline-coupled with the carrier 76. The carrier 76 is rotatably supported in the center of the planetary gears 78. As a result, the rotational speed of the first inner shaft 30 is decelerated while passing through the sun gear 74, the plurality of planetary gears 78, and the carrier 76 and torque thereof is increased to then be transmitted to the second inner shaft 32.

In this way, the inner shafts 30 and 32 are interconnected via the planetary gear set 70 to thus decelerate the rotational speed of the inner rotor 40 to then be transmitted to the pulsator 130, to thereby increase the torque and accordingly be applicable to a large-capacity washing machine requiring high torque driving.

A first sleeve bearing 80 and a second sleeve bearing 82 both of which are in the form of a cylinder are provided between the inner circumferential surface of the of the first inner shaft 30 and the outer circumferential surface of the first outer shaft 20 to thus rotatably support the first inner shaft 30.

Then, a third sleeve bearing 84 and a fourth sleeve bearing 86 are provided on upper and lower inner surfaces of the second outer shaft 22 to thus rotatably support the second inner shaft 32.

A first connector 90 to which an outer rotor support 56 of the outer rotor 50 is connected is formed on an outer surface of the first outer shaft 20, and a second connector 92 to which an inner rotor support 46 of the inner rotor 40 is connected is formed on the bottom of the first inner shaft 30

The first connector 90 and the second connector 92 may be serration-coupled or spline-coupled through protrusions formed on the outer surfaces of the first outer shaft 20 and the first inner shaft 30, or mutually key-coupled through key grooves formed on the outer surfaces of the first outer shaft 20 and the first inner shaft 30.

Here, a first locking nut 34 is screwed and coupled at the lower end of the first outer shaft 20, in which the first locking nut 34 prevents the departure of the outer rotor support 56 from the first outer shaft 20, and a second locking nut 36 is screwed and coupled at the lower end of the first inner shaft 30, in which the second locking nut 36 prevents the departure of the inner rotor support 46 from the first inner shaft 30.

A third connector 94 is formed on the upper outer surface of the second outer shaft 22 in which the washing tub 120 is connected to the third connector 94, and a fourth connector 96 is formed on the upper outer surface of the second inner shaft 32 in which the pulsator 130 is connected to the fourth connector 96.

The third connector 94 and the fourth connector 96 may be serration-coupled or spline-coupled through protrusions formed on the outer surfaces of the second outer shaft 22 and the second inner shaft 32, or mutually key-coupled through key grooves formed on the outer surfaces of the second outer shaft 22 and the second inner shaft 32.

A first seal 220 is mounted between the second outer shaft 22 and the second inner shaft 32 to prevent the washing water from leaking, and a second seal 210 is mounted between the second outer shaft 22 and a second bearing housing 10 to prevent the washing water from leaking.

A first bearing 26 is disposed on the outer surface of the first outer shaft 20 and a second bearing 28 is disposed on the outer surface of the second outer shaft 22, to thus rotatably support the outer shafts 20 and 22.

The first bearing 26 is provided in a first bearing housing 102 and the second bearing 28 is provided in the second bearing housing 10.

The first bearing housing 102 is formed of a metallic material, and includes: a first bearing mount portion 104 in which the first bearing 26 is mounted; a cover portion 106 that is extended outwardly from the first bearing mount portion 104 to thus form a cylindrical shape, and that is disposed with a predetermined gap to wrap around the outer surface of the planetary gear set 70 to protect the planetary gear set 70; a stator 60 that is extended outwardly from the top of the cover portion 106 to thus form a circular plate; and a flat plate portion 108 to which the outer tub 110 is fixed.

The flat plate portion 108 is coupled with and fixed to the second bearing housing 10 in the circumferential direction thereof by a plurality of bolts 250.

The second bearing housing 10 is formed of a metallic material, and includes: a second bearing mount portion 12 in which the second bearing 28 is mounted; a second seal fastener 14 that is extended outwardly from the second bearing mount portion 12 to thus fasten the second seal 210; a connector 16 that is bent downwardly from the second seal fastener 14 to thus form a cylindrical shape; and a flat plate portion 18 that is extended outwardly from the connector 16 to thus be fixed to the outer tub 110.

The flat plate portion 18 of the second bearing housing 10 is coupled with the flat plate portion 108 of the first bearing housing 102 by the bolts 250 and is fixed to a stator support 270 and the outer tub 110 by bolts 260.

In this case, in the present invention, the ring gear 72 of the planetary gear set 70 is inserted and connected between the first outer shaft 20 and the second outer shaft 22, and the first bearing 26 supporting the first outer shaft 20 and the second bearing 28 supporting the second outer shaft 22 enable two-way rotation.

As a result, in the present invention, the planetary gear set 70 is set to a state enabling two-way rotation, and such a structure of the planetary gear set 70 having the state enabling two-way rotation differs from a support structure of the conventional planetary gear set of the full-automatic washing machine where the conventional planetary gear set is maintained to be fixed or is rotated in only one direction for the dehydration stroke.

As described later in the present invention, since the planetary gear set 70 is set to a state enabling two-way rotation, the washing tub 120 and the pulsator 130 are rotated simultaneously or selectively, and in an identical direction and mutually opposite directions by the washing machine motor 140 of a double rotor-double stator dual-power structure, to thereby enable to form a variety of washing water flows.

The washing machine motor 140 of a double rotor-double stator dual-power structure will be described below in detail with reference to 2, 3 and 5.

The washing machine motor 140 includes the outer rotor 50, the inner rotor 40, and the stator 60, in which the stator 60 includes an outer stator and an inner stator to drive the outer rotor 50 and the inner rotor 40 optionally/independently, respectively. In an embodiment to be described below and illustrated in the following, the outer stator and the inner stator are configured in a one-piece, but can be formed in a separate structure.

Figure 5:
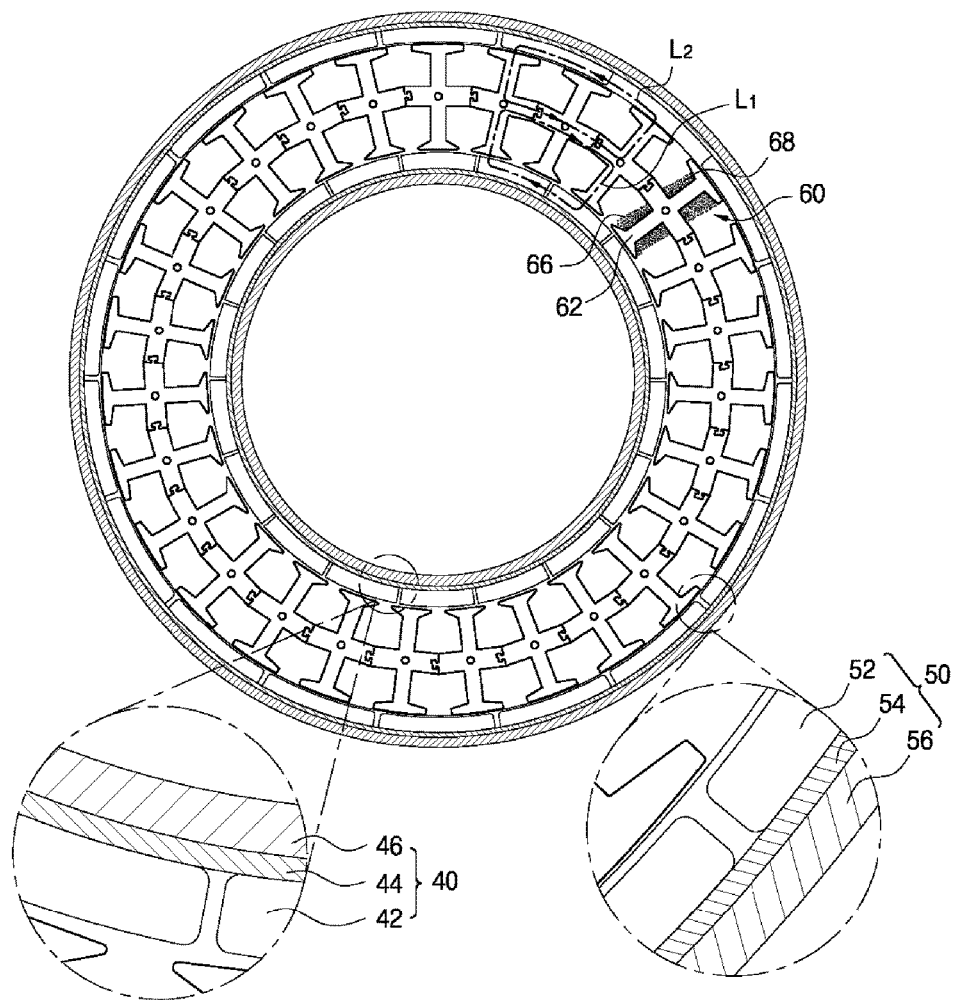
FIG. 5 is a diametrical cross-sectional view in the direction of the washing machine motor according to the first embodiment of the present invention.

First, as shown in FIG. 5, the inner rotor 40 includes: a plurality of first magnets 42 that are disposed on the inner surface of the stator 60 with a certain gap, in which N-poles and S-poles are arranged alternately; a first back yoke 44 disposed on the rear surface of the plurality of first magnets 42; and an inner rotor support 46 that is integrally formed with the first magnets 42 and the first back yoke 44 by an insert molding method.

Here, the inner rotor support 46 is integrally formed the plurality of first magnets 42 and the first back yoke 44 by molding a thermosetting resin, for example, a BMC (Bulk Molding Compound) molding material such as polyester. Thus, the inner rotor 40 may have waterproof performance, and shorten the manufacturing process.

The inner end of the inner rotor support 46 is connected to the second connector 92 of the first inner shaft 30, the first magnets 42 and the first back yoke 44 are fixed to the outer surface of the outer end of the inner rotor support 46, and the inner rotor support 46 has a substantially cup shape so that the planetary gear set 70 is accommodated at the inner side of the inner rotor support 46, so as to implement a compact structure.

Therefore, when the inner rotor 40 rotates, the inner shafts 30 and 32 are rotated, and the pulsator 130 connected to the inner shafts 30 and 32 is decelerated and rotated through the planetary gear set 70.

Here, the pulsator 130 does not have a large rotational torque and thus may be fully rotated by a torque of the inner rotor 40.

Then, the outer rotor 50 includes: a plurality of second magnets 52 that are disposed on the outer surface of the stator 60 with a certain gap in which N-poles and S-poles are alternately arranged; a second back yoke 54 disposed on the rear surface of the plurality of the second magnets 52; and an outer rotor support 56 that is integrally formed with the second magnets 52 and the second back yoke 54 by an insert molding method.

Here, the outer rotor support 56 is integrally formed the plurality of second magnets 52 and the second back yoke 54 by molding a thermosetting resin, for example, a BMC (Bulk Molding Compound) molding material such as polyester. Thus, the outer rotor 50 may have waterproof performance, and shorten the manufacturing process.

The inner end of the outer rotor support 56 is connected to the first connector 90 of the first outer shaft 20, and is rotated with the first outer shaft 20, the second magnets 52 and the second back yoke 54 are fixed to the inner surface of the outer end of the outer rotor support 56, and the outer rotor support 56 has a substantially cup shape so that the planetary gear set 70 is accommodated at the inner side of the outer rotor support 56 and has an inverted cup shape so that the stator 60 is accommodated at the outer side of the outer rotor support 56, so as to implement a compact structure.

Therefore, when the outer rotor 50 rotates, the outer shafts 20 and 22 are rotated, and the washing tub 120 connected to the outer shafts 20 and 22 through the ring gear 72 of the planetary gear set 70 is rotated without deceleration.

As shown in FIG. 5, the stator 60 includes: a plurality of stator cores 62 that are assembled in an annular shape; non-magnetic bobbins 64 that are configured to wrap the outer circumferential surfaces of the plurality of stator cores 62, respectively; a first coil 66 that is wound on one side (i.e., the inside thereof) of each of the stator cores 62; a second coil 68 that is wound on the other side (i.e., the outside thereof) of each of the stator cores 62; and a stator support 270 in which the plurality of stator cores 62 are arranged in an annular shape and whose outer circumferential portion is fixed to the outer tub 110.

The stator support 270 is integrally formed on the stator cores 62 by arranging the plurality of stator cores 62 with a predetermined interval in the circumferential direction thereof in a mold by an insert molding method. A throughhole is formed in the central portion of the stator support 270 so that the inner rotor 40 and the planetary gear set 70 are disposed in the central portion of the stator support 270, while the outer circumferential portion of the stator support 270 is bent in a two-stage form to thus surround the outer rotor 50 in which the front end of the stator support 270 is fixed to the outer tub 110 by the bolts 260 together with the second bearing housing 10.

In other words, the stator support 270 is molded by the insert molding method by molding a thermosetting resin, for example, a BMC (Bulk Molding Compound) molding material such as polyester. In this case, the plurality of stator cores 62 are arranged in a circumferential direction thereof at a predetermined distance in a mold, and thus are integrally formed.

In addition, other than the structure that the stator support 270 is integrally formed with the stator cores 62 by insert molding, the stator support 270 may be separately manufactured from the stator cores 62 by using a resin or a metal material and then coupled with the stator cores 62 by using bolts.

Figure 6:
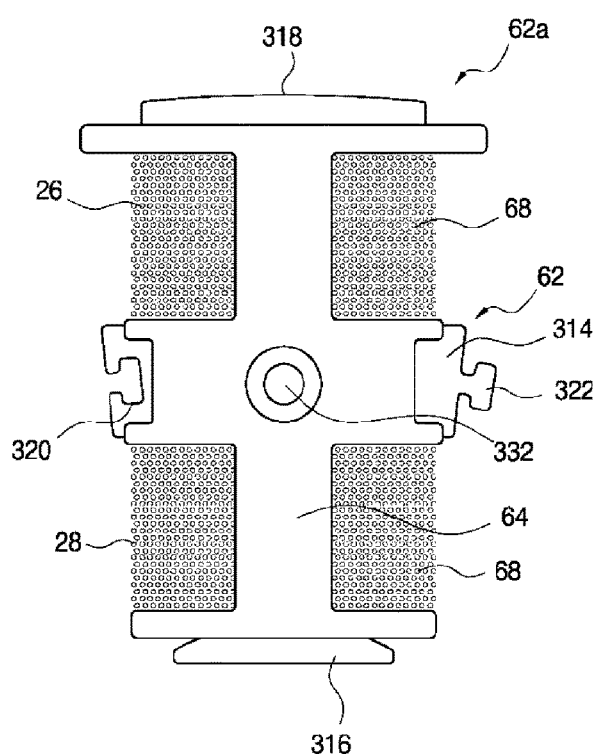
FIG. 6 is a schematic cross-sectional view of a stator core assembly constituting a stator according to the first embodiment of the present invention.

The stator 60 according to an embodiment of the present invention may be configured by assembling a plurality of stator core assemblies 62a configured by using a plurality of split cores as shown in FIG. 6, in an annular shape as shown in FIG. 5, or may be configured by using a one-piece stator core.

In the embodiment shown in FIG. 5, the stator 60 may be configured by using a split core by a tooth, or configured by making several teeth, for example, three teeth into a split core and assembling the split core. In particular, in the case of a BLDC motor of a U, V, W 3-phase drive system, it is also desirable to make three teeth into a split core when winding a coil in series to the three teeth with respect to any one phase of U, V, and W phases.

Figure 7:
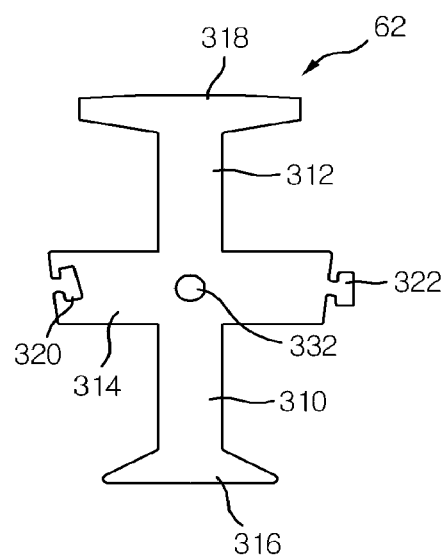
FIG. 7 is a cross-sectional view of a split core constituting a stator core according to the first embodiment of the present invention.

As shown in FIGS. 6 and 7, the stator core 62 includes: a first teeth portion 310 around which the first coil 66 is wound; a second teeth portion 312 that is formed on the other side of the first teeth portion 310 and around which the second coil 68 is wound; a partition 314 for partitioning between the first teeth portion 312 and the second teeth portion 314; and couplers 320 and 322 formed on both lateral ends of the partition 314 and interconnecting between the adjoining stator cores 62.

Here, since a first power source is supplied for the first coil 66 and a second power source is supplied for the second coil 68, only the inner rotor 40 is rotated when the power is supplied for only the first coil 66, only the outer rotor 50 is rotated when the power is supplied for only the second coil 68, and both the inner rotor 40 and the outer rotor 50 are simultaneously rotated when the power is supplied for both the first coil 66 and the second coil 68.

A throughhole 332 is formed at the center of the partition 314 to play a role of preventing a first magnetic circuit formed by the first coil 66 and a second magnetic circuit formed by the second coil 68 from interfering with each other. The throughhole 332 may be formed lengthily in the lateral direction of the partition 314, in a slot form, other than the circular shape.

A first flange 316 is formed at the end of the first teeth portion 310 so as to be disposed to face the first magnets 42 and a second flange 318 is formed at the end of the second teeth portion 312 so as to be disposed to face the second magnets 52.

The first flange 316 and the second flange 318 are formed to have inward and outward curved surfaces at predetermined curvatures, respectively, to correspond to the first magnet 42 of the inner rotor 40 and the second magnet 52 of the outer rotor 50. Thus, the roundness of the inner circumferential surface and the outer circumferential surface of the stator core 62 is increased and thus certain magnetic gaps can be maintained between the inner circumferential surface of the stator 60 and the first magnet 42 and between the outer circumferential surface of the stator 60 and the second magnet 52, respectively, although the inner circumferential surface and outer circumferential surface of the stator 60 are proximate to the first magnet 42 and the second magnet 52.

The plurality of stator cores 62 should have a structure of being directly connected to each other so as to form a magnetic circuit. Thus, the couplers 320 and 322 of one stator core 62 have a structure of being directly connected to the couplers 322 and 320 of another adjacent stator core 62 so that the stator cores 62 can be energized.

As an example, these couplers 320 and 322 are configured so that a coupling protrusion 322 is protrudingly formed at one side of the partition 314 and a coupling groove 320 with which the coupling protrusion 322 is fitted and coupled is formed at the other side of the partition 314. Thus, when the coupling protrusion 322 is fitted into and coupled with the coupling groove 320, the stator cores 62 are radially arranged, and have a directly cross-linked structure that the stator cores 62 are directly connected with each other.

In addition to the above structure, the couplers have a structure that pinholes are form at both end portions of the partition of each of the stator cores, and a pin member is fitted into and coupled with the pinholes of two stator cores at a state where the stator cores 62 contact each other, to thereby employ a structure of connecting between the stator cores. Alternatively, the couplers may employ a method of caulking the stator cores by using a caulking member in a state where the stator cores contact each other.

The stator 60 according to an embodiment of the present invention is configured so that the first teeth portion 310 around which the first coil 66 is wound forms the inner stator, and the second teeth portion 312 that is formed on the opposite side of the first teeth portion 310 and around which the second coil 68 is wound forms the outer stator, to thereby constitute a double stator.

The washing machine motor 140 according to an embodiment of the present invention forms a first magnetic circuit L1 between the inner rotor 40 and one side of the stator 60 (that is, the inner stator) where the first coil 66 is wound, and forms a second magnetic circuit L2 between the outer rotor 50 and the other side of the stator 60 (that is, the outer stator) where the second coil 68 is wound, to thus form a pair of magnetic circuits each independent to each other. As a result, the inner rotor 40 and the outer rotor 50 can be respectively driven separately.

More specifically, the first magnetic circuit L1 includes a first magnet 42 of an N-pole, a first teeth portion 310 on which the first coil 66 is wound, an inner part of the partition 314, the first magnet 42 of an S-pole adjacent to the first magnet 42 of the N-pole, and an inner rotor housing 46.

In addition, the second magnetic circuit L2 includes a second magnet 52 of an N-pole, a second teeth portion 312 facing the second magnet 52 of the N-pole and on which the second coil 68 is wound, an outer part of the partition 314, the second magnet 52 of an S-pole, and the outer rotor housing 56.

In the above-described first embodiment, the output of the inner rotor 40 of the washing machine motor 140 is transmitted to the inner shafts 30 and 32, and the output of the outer rotor 50 thereof is transmitted to the outer shafts 20 and 22.

In such a motor structure, a high torque output generated from the outer rotor 50 of a larger diameter is transmitted to the washing tub 120 through the outer shafts 20 and 22 and a low torque output generated from the inner rotor 40 of a smaller diameter is torque-converted through the inner shafts 30 and 32 and the planetary gear set 70. Thus, since the high torque output is transmitted to the pulsator 130, the washing tub 120 requiring a relatively high torque for driving can be smoothly driven. Therefore, according to an embodiment of the present invention, a variety of washing and rinsing water flows can be formed for use in the washing tub 120 as well as the pulsator 130 during washing and rinsing strokes.

Figure 10:
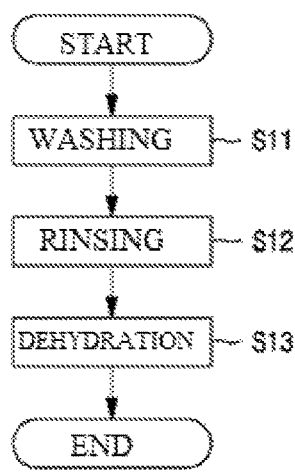
FIG. 10 is a flowchart showing the overall washing machine control method according to the present invention.

FIG. 10 is a sectional view of a washing machine motor according to a second embodiment of the present invention.

The washing machine motor 140 according to the second embodiment includes: outer shafts 20 and 22 which are connected with a washing tub 120; inner shafts 30 and 32 which are rotatably arranged inside the outer shafts 20 and 22 and connected with a pulsator 130; an inner rotor 40 which is connected with the outer shafts 20 and 22; an outer rotor 50 which is connected to the inner shafts 30 and 32; a stator 60 which is disposed with an air gap between the inner rotor 40 and the outer rotor 50, to thus independently rotatably drive the inner rotor 40 and the outer rotor 50; and a planetary gear set 70 that is mounted the inner shafts 30 and 32 to thus slow down the rotational speed of the inner shafts 30 and 32 and increase the torque.

When comparing the washing machine motor 140a according to the second embodiment with the washing machine motor 140 according to the first embodiment, the washing machine motor 140 according to the first embodiment has a structure that the pulsator 130 and the inner rotor 40 are connected by the planetary gear set 70, and the washing tub 120 and the outer rotor 50 are connected by the planetary gear set 70, while the washing machine motor 140a according to the second embodiment has a structure that the washing tub 120 and the inner rotor 40 are connected by the planetary gear set 70, and the pulsator 130 and the outer rotor 50 are connected by the planetary gear set 70. Thus, the shapes of the inner rotor support 46 and outer rotor support 56 according to the first embodiment are different from those of the second embodiment.

The washing machine driving method of the washing machine motor 140a according to the second embodiment is the same as the driving method of the washing machine according to the first embodiment described above. However, there is a difference between the washing machine driving method according to the first embodiment and the washing machine driving method according to the second embodiment, in that the former is configured so that the rotational force of the inner rotor 40 is transmitted to the pulsator 130, and the rotational force of the outer rotor 50 is transmitted to the washing tub 120, but the latter is configured so that the rotational force of the outer rotor 50 is transmitted to the pulsator 130, and the rotational force of the inner rotor 40 is transmitted to the washing tub 120.

The control method of the washing machine according to an embodiment of the present invention will now be described with reference to FIGS. 9 to 16.

Figure 9:
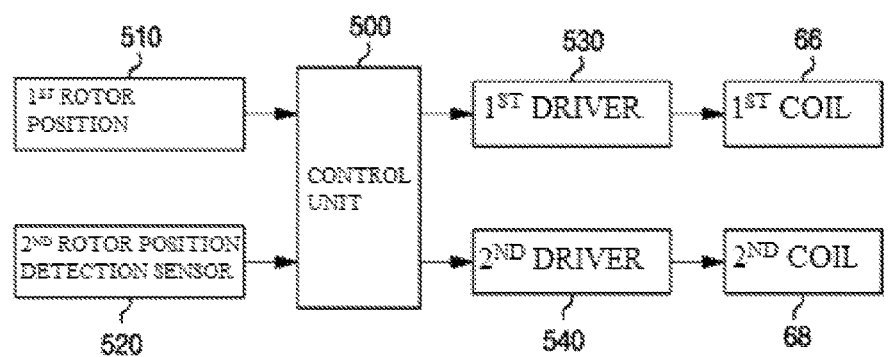
FIG. 9 is a block diagram of a washing machine control apparatus according to the present invention.
Figure 11:
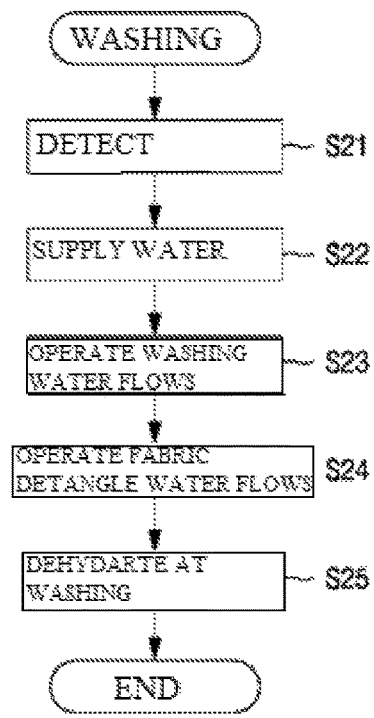
FIG. 11 is a flowchart showing in detail a washing stroke in FIG. 10.
Figure 12:
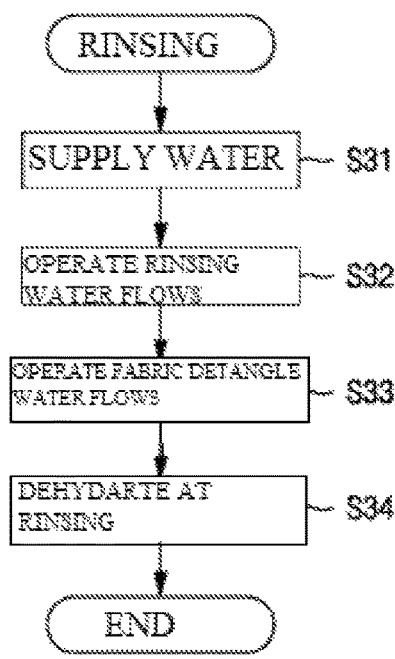
FIG. 12 is a flowchart showing in detail a rinsing stroke in FIG. 10.

FIG. 9 is a block diagram of a washing machine control apparatus according to an embodiment of the present invention, FIG. 10 is a flowchart showing the overall washing machine control method according to an embodiment of the present invention, FIG. 11 is a flowchart showing details of a washing stroke in FIG. 10, and FIG. 12 is a flowchart illustrating in detail a rinsing stroke in FIG. 10.

Referring to FIG. 9, a washing machine control apparatus according to an embodiment of the present invention includes: a first driver 530 for generating a first drive signal applied to the first coil 66; a second driver 540 for generating a second drive signal applied to the second coil 68, and a control unit 500 for controlling the first driver 530, the second driver 540 and the entire washing machine.

The control unit 500 is configured to play a role of a system control unit that serves to control the first and second drivers 530 and 540, and simultaneously the entire washing machine as described above, or is configured to function as a driver dedicated control unit that receives a washing control signal that is determined according to a washing course set by a user from a system control unit of a main body of a washing machine and then applies individual control signals to the first and second drivers 530 and 540 based on the washing control signal. The control unit 500 may be implemented by using a signal processor such as a microcomputer or a microprocessor.

According to an embodiment of the present invention, the washing machine motor 140 has a double rotor-double stator dual-power structure, for example, the motor control thereof is performed by a U, V, W three-phase drive method. Therefore, the first and second coils 66 and 68 of the stator 60 are formed to include U, V, and W 3-phase coils, respectively. The first coil 66 wound on the inner teeth portion 310 forms the inner stator, and the second coil 68 wound on the outer teeth portion 312 forms the outer stator.

As a result, the inner stator and the inner rotor 40 that is rotated by the inner stator forms the inner motor, and the outer stator and the outer rotor 50 that is rotated by the outer stator forms the outer motor. The motor structures of the inner motor and the outer motor are designed so as to be controlled in a BLDC method, respectively, and the first and second drivers 530 and 540 perform a drive control, for example, a six-step drive control method.

The first and second drivers 530 and 540 are made of inverters consisting of three pairs of switching transistors connected in a totem pole structure, respectively. The three-phase outputs from the respective inverters are applied to the U, V, W 3-phase coils of the first and second coils 66 and 68, respectively.

The control unit 500 detects the rotational positions of the inner rotor 40 and the outer rotor 50 from first and second rotor position detection sensors 510 and 520, respectively, for example, Hall sensors and applies control signals of a PWM method to the first and second drivers 530 and 540. In this case, the first and second drivers 530 and 540 apply the U, V, W 3-phase outputs to the U, V, W 3-phase coils of the first and second coils 66 and 68, respectively, to thereby rotatably drive the inner rotor 40 and the outer rotor 50.

The control unit 500 contains programs of various washing courses. As shown in FIG. 10, by default, the entire washing course includes a washing stroke S11, a rinsing stroke S12, and a dehydration stroke S13 and also includes a water supply stroke and a water discharge stroke, before and after each of the strokes S11, S12 and S13. According to the washing course, at least one of the washing cycle S11, the rinsing cycle S12, and the dehydration stroke S13 is performed repeatedly by a number of times.

As shown in FIG. 11, the washing stroke S11 includes: a weight detection stroke S21 for sensing weight of laundry that is put into the washing tub 120; a water supply stroke S22 for supply water based on the weight of the laundry detected according to the weight detection stroke S21; a washing water flow stroke S23 for operating the washing water flow to carry out washing of the laundry after completion of the water supply; a fabric detangle water flow stroke S24 for operating the fabric detangle water flow in order to detangle the laundry tangled in the washing water flow stroke S23; and a washing dehydration stroke S25 for dehydrating the laundry after completing the washing stroke S11.

In addition, as shown in FIG. 12, the rinsing stroke S12 includes: a water supply stroke S31 for supplying water required for performing the rinsing; a rinsing water flow stroke S32 for operating the rinsing water flow in order to perform rinsing of the laundry after completion of the water supply; a fabric detangle water flow stroke S33 for operating the fabric detangle water flow in order to detangle the laundry tangled in the rinsing water flow stroke S32; and a rinsing dehydration stroke S34 for dehydrating the laundry after completing the rinsing stroke S12.

A method of forming a wash water flow that can be applied to the above-described washing water flow stroke S23 and rinsing water flow stroke S32 will be described below in detail with reference to FIGS. 13 through 16.

First, a washing machine according to an embodiment of the present invention employs a washing machine motor 140 having a double rotor-double stator structure, adopts first and second drivers 530 and 540 to apply the U, V, W 3-phase outputs to the U, V, W 3-phase coils of the first and second coils 66 and 68 to rotatably drive the inner rotor 40 and the outer rotor 50, and applies the rotational forces of the inner rotor 40 and the outer rotor 50 to the pulsator 130 and the washing tub 120, through the inner shafts 30 and 32, the outer shafts 20 and 22, and the planetary gear set 70, to independently drive the pulsator 130 and the washing tub 120. In addition, the planetary gear set 70 is supported by the first and second bearings both of which enable two-way rotation, to thereby control the rotational direction and the rotational speed of the pulsator 130 and the washing tub 120, to thus form a variety of water flows.

First, when only the pulsator 130 is rotatably driven, a driving signal is applied to the first coil 66 by the first driver 530. Then, the inner rotor 40 is rotated in the forward direction, that is, in the clockwise (CW) direction by the magnetic circuit L1 and the inner shafts 30 and 32 connected to the inner rotor 40 are rotated, to thus rotate the pulsator 130 clockwise. In this case, the rotational force of the first inner shaft 30 is transmitted to the second inner shaft 32 through the sun gear 74 and the carrier 76 of the planetary gear set 70, while the rotational speed is decelerated and the torque is increased to thereby rotate the pulsator 130.

The reduction ratio of the planetary gear set 70 can be set to, for example, 5:1.

In this case, according to an embodiment of the present invention, since the planetary gear set 70 is not in a constrained state, when a certain amount or more of the laundry is put inside the washing tub 120, a load is applied to the pulsator 130, and the carrier 76 connected to the pulsator 130 acts as a brake. Then, when the rotational force of the inner rotor 40 is input to the sun gear 74, the rotational force is output to the ring gear 72, and the washing tub 120 and the outer rotor 50 associated with the ring gear 72 are rotated in a direction reverse to the rotational direction of the inner rotor 40, that is, in the counterclockwise (CCW) direction.

Meanwhile, when there is no laundry in the washing tub 120 or there is laundry less than a set value in the washing tub 120 (when there is no load or a small load in the pulsator 130), the ring gear 72 of the planetary gear set 70 performs a brake operation since the ring gear 72 is connected to the outer shafts 20 and 22 and the washing tub 120. Accordingly, the rotational force of the inner rotor 40 is input to the sun gear 74 and is output to the carrier 76. Thus, the pulsator 130 connected to the carrier 76 is rotated.

That is, when there is no laundry in the washing tub 120 or there is laundry less than a set value in the washing tub 120, the rotational force of the inner rotor 40 is transmitted to the pulsator 130, and thus the pulsator 130 is rotated.

Thus, when only the pulsator 130 is rotatably driven, the vertically rising and falling rotary water flows may be formed and are mainly used in a general washing mode.

In the case of washing of the full-automatic washing machine, when the pulsator 130 is rotated, the washing tub 120 should be fixed or reversely rotated to create rising and falling water flows to thus maximize the washing efficiency.

However, according to an embodiment of the present invention, there is no constraint unit such as a clutch 70 with respect to the planetary gear set 70. Thus, when the washing tub 120 is attached to the outer rotor 50 of the washing machine motor 140, the washing tub 120 is rotated by piggybacking rotation of the pulsator 130. However, the piggybacking rotation of the washing tub 120 forms a vortex to prevent the rising and falling water flow to thus perform washing of only one side of laundry to thereby lower the washing efficiency of the laundry.

According to an embodiment of the present invention, the washing tub 120 has a large, heavy structure compared to the pulsator 130 and has large stop inertia. According to the large stop inertia of the washing tub 120, the stop inertia is used in response to a control flow shown in FIG. 16, and then the rotation of the pulsator 130 is stopped before the washing tub 120 is rotated through piggybacking, to thus prevent a vortex from creating to thereby increase the washing efficiency.

Figure 16:
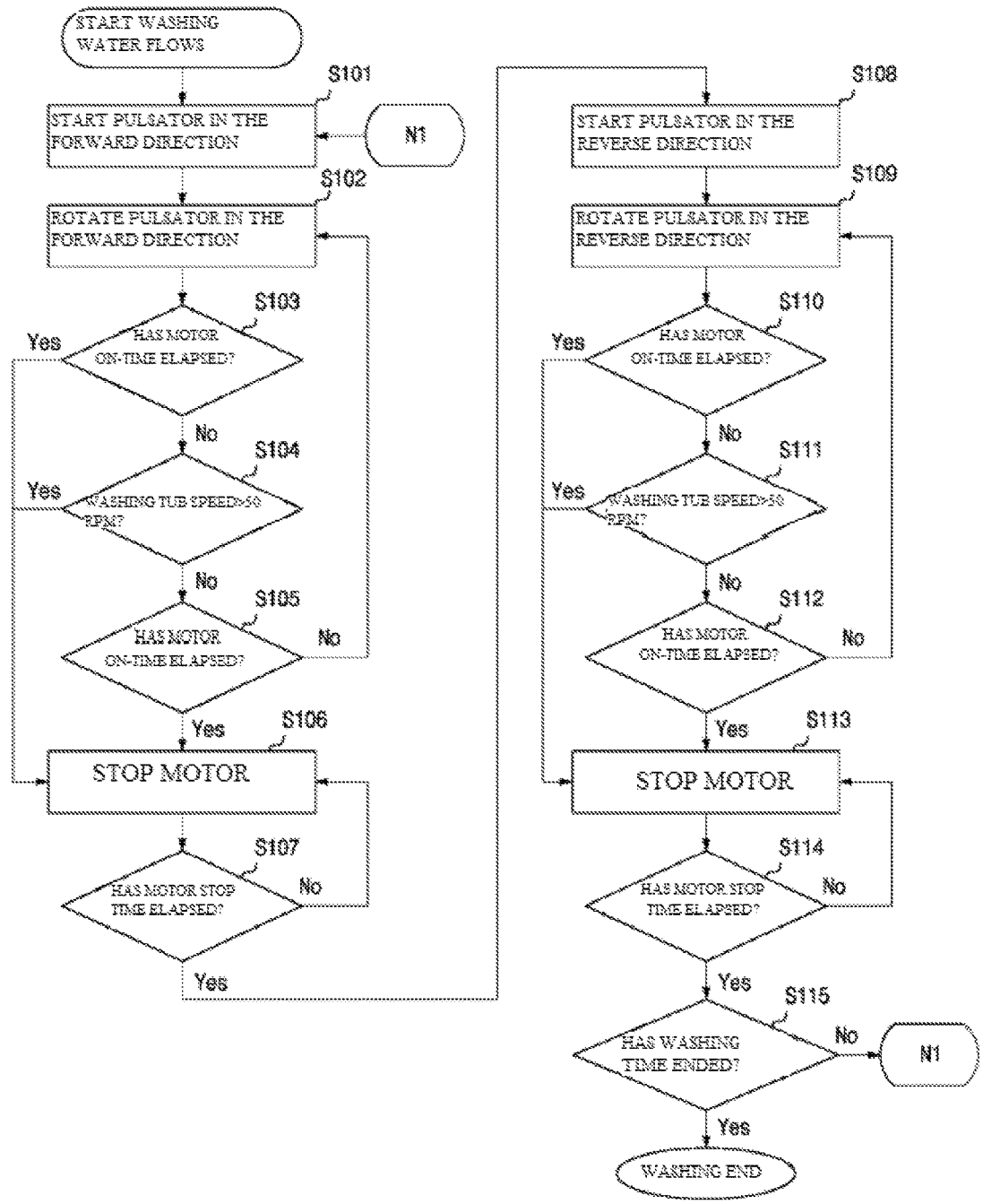
FIG. 16 is a flowchart illustrating a method of forming a mono-power (pulsator) washing water flow by using an inertial force control of according to the present invention.

FIG. 16 is a flowchart illustrating a method of forming a mono-power (pulsator) washing water flow by using a control of the force of inertia according to an embodiment of the present invention. The flowchart shown in FIG. 16 may be used in forming the washing water flow enabling energy saving when the amount of the laundry is not much.

Referring to FIG. 16, in order to rotate the inner rotor 40 in a predetermined RPM, the inner rotor 40 is rotated by using one of the well-known start-up methods such as a ramp-up start-up method and a sequential start-up method of increasing the RPM gradually according to lapse of time, to thereby start up the pulsator 130 in the forward or clockwise (CW) direction (S101).

After the start-up of the pulsator 130, the pulsator 130 rotates in the forward direction or in the clockwise (CW) direction (S102). Then, it is determined whether a predetermined time at which the pulsator 130 rotates in the forward direction or clockwise (CW), i.e., a motor-on time (ON TIME) elapses (S103).

As a result of the determination, when it is determined that the motor-on time (ON TIME) has elapsed, the process proceeds to a step S106 of stopping the inner rotor 40, that is, the motor, while when the motor-on time (ON TIME) has not elapsed, the piggybacking rotational speed of the washing tub 120 is measured, to then determine whether the piggybacking rotational speed of the washing tub 120 exceeds, for example, 50 RPM (S104).

As a result of the determination, when it is determined that the piggybacking rotational speed of the washing tub 120 exceeds 50 RPM, the process proceeds to a step S106 of stopping the motor, while when the piggybacking rotational speed of the washing tub 120 does not exceed 50 RPM, the process proceeds to a step S102 to thereby rotate the pulsator 130 in the forward direction or in the clockwise (CW) direction until the piggybacking rotational speed of the washing tub 120 exceeds 50 RPM.

As described above, when the piggybacking rotational speed of the washing tub 120 exceeds 50 RPM or the motor on-time (ON TIME) has elapsed, the motor is stopped (S106), and it is determined whether a preset motor stop time has elapsed (S107), while when a preset motor stop time has elapsed, steps S108 to S113 are executed reversely to the forward rotation, in order to rotate the pulsator 130 in the reverse direction, that is, in the counterclockwise (CCW) direction.

Then, when the reverse piggybacking rotational speed of the washing tub 120 exceeds 50 RPM or when the motor on-time (ON TIME) has elapsed, the motor is stopped (S113) and it is determined whether a preset motor stop time has elapsed (S114).

As the determination result, when the preset stop time has elapsed, it is determined whether the washing time has ended (S115). When the washing time has ended, the washing stroke is finished and proceeds to the subsequent processing stroke, while the washing time has not ended, it proceeds to step S101 to repeat the above procedure.

As described above, the mono-power (pulsator) washing water flow is applied when there is a relatively small amount of laundry. According to an embodiment of the present invention, when only the pulsator 130 is driven fast to thus form a washing water flow, the piggybacking rotation of the washing tub 120 is detected (sensor detection or time control). When it is determined that the piggybacking rotation of the washing tub 120 reaches a certain degree of RPM, the forward rotation of the pulsator 130 stops and the reverse rotation thereof advances repeatedly until a preset time elapses, to thereby form rising and falling water flows to thus suppress the piggybacking rotation of the washing tub 120. According to the embodiment of the present invention, the piggybacking rotation of the washing tub 120 is prevented to thus execute a control of preventing a creation of the vortex and improve the washing efficiency.

Meanwhile, when only the washing tub 120 is driven, a drive signal is applied to the second coil 68 by the second driver 540. In this case, while the outer rotor 50 is rotated, the outer shafts 20 and 22 and the ring gear 72 of the planetary gear set 70 that are associated with the outer rotor 50 are rotated, to thereby rotate the washing tub 120.

In this way, in the case that only the washing tub 120 is driven, a fabric tangling preventive water flow can be formed.

A method of forming dual-power washing water flows of mutually opposite directions in accordance with an embodiment of the present invention will be described below with reference to FIG. 15.

When the pulsator 130 and the washing tub 120 are driven in respectively different directions and at an identical speed, strong water flows can be formed to enhance a cleaning capability, which can be used in a washing mode requiring a strong cleaning capability.

When the pulsator 130 and the washing tub 120 are driven in respectively different directions and at respectively different speeds, strong water flows of a variety of types of patterns can be formed to thus implement various washing modes.

Figure 15:
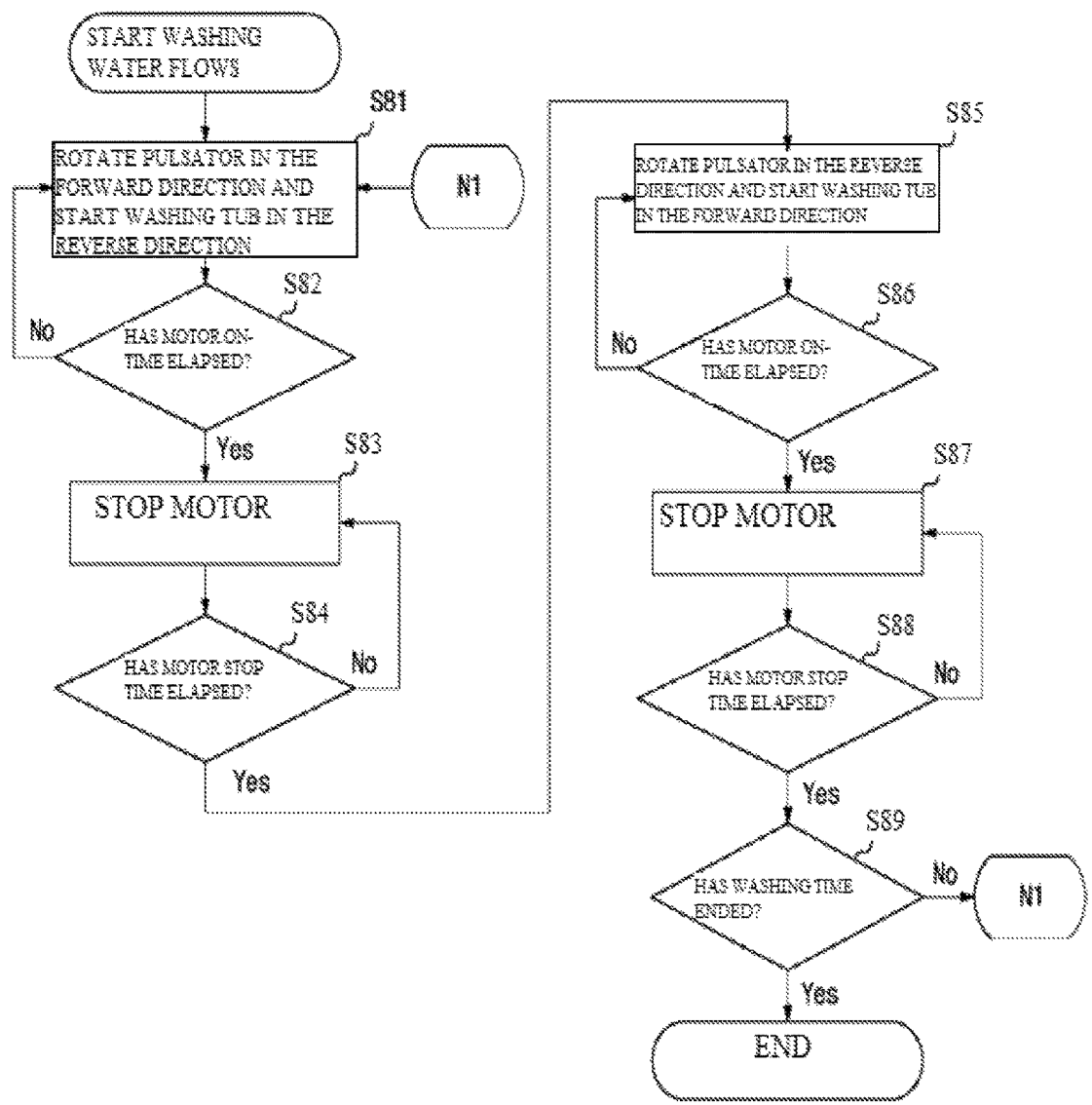
FIG. 15 is a flowchart illustrating a method of forming mutually opposite direction dual-power washing water flow in accordance with the present invention.

Referring to FIG. 15, first, the inner rotor 40 is made to rotate in the forward direction, and the outer rotor 50 is made to rotate in the reverse direction, to thus rotate the pulsator 130 in the forward direction and rotate the washing tub 120 in the reverse direction (S81).

Then, it is determined whether a preset time for which the inner rotor 40 is rotated in the forward direction, and the outer rotor 50 is rotated in the reverse direction, that is, a motor on-time (ON TIME) has elapsed(S82).

As the determination result, when it is determined that the motor on-time (ON TIME) has elapsed, the process proceeds to step S83 to stop the inner and outer rotors 40 and 50, that is, the motor, to thus stop the motor, and then the process proceeds to step S84 to determine whether a preset motor stop time has elapsed.

As the determination result, when it is determined that the preset motor stop time has elapsed, the pulsator 130 is rotated in the reverse direction, that is, in a counterclockwise (CCW) direction, and the washing tub 120 is rotated in the forward direction, that is, in a clockwise (CW) direction, in steps S85 through S88, in opposition to steps S81 to S84.

When it is determined that the preset motor stop time has elapsed in step S88, it is determined whether the washing time has ended in step S89. When the washing time has ended, the washing stroke is finished and the process proceeds to the subsequent processing stroke, while when the washing time does not end, the process proceeds to step S81 to repeat the above procedures S81 to S89.

As mentioned above, when the pulsator 130 and the washing tub 120 are driven in respectively different directions and at an identical speed, strong water flows can be formed while when the pulsator 130 and the washing tub 120 are driven in respectively different directions and at respectively different speeds, strong water flows of a variety of types of patterns can be formed.

In particular, when the pulsator 130 and the washing tub 120 are driven in respectively different directions and at respectively different speeds, strong vertical rising/falling water flows are formed by the pulsator 130 and the vortex is created by the washing tub 120, to thus enhance a cleaning capability and improve rinsing performance.

In an embodiment of the present invention, rhythm water flows can be formed by varying the rotational speeds of the pulsator 130 and the washing tub 120, to thereby implement a rhythm washing mode. That is, when the rotation speeds of the pulsator 130 and the washing tub 120 are controlled to be rapidly variable, strong water flows and rhythm water flows can be formed to thus prevent damage to the laundry.

The rotation speeds of the pulsator 130 and the washing tub 120 can be varied by varying voltage levels and current values of a first drive signal and a second drive signal that are applied to the first and second coils 66 and 68 by controlling the first driver 530 and the second driver 540 by the control unit 500.

When the rotation speeds of the pulsator 130 and the washing tub 120 are controlled to be gradually variable, smooth rhythm water flows can be formed to thus prevent damage to the laundry.

Figure 13:
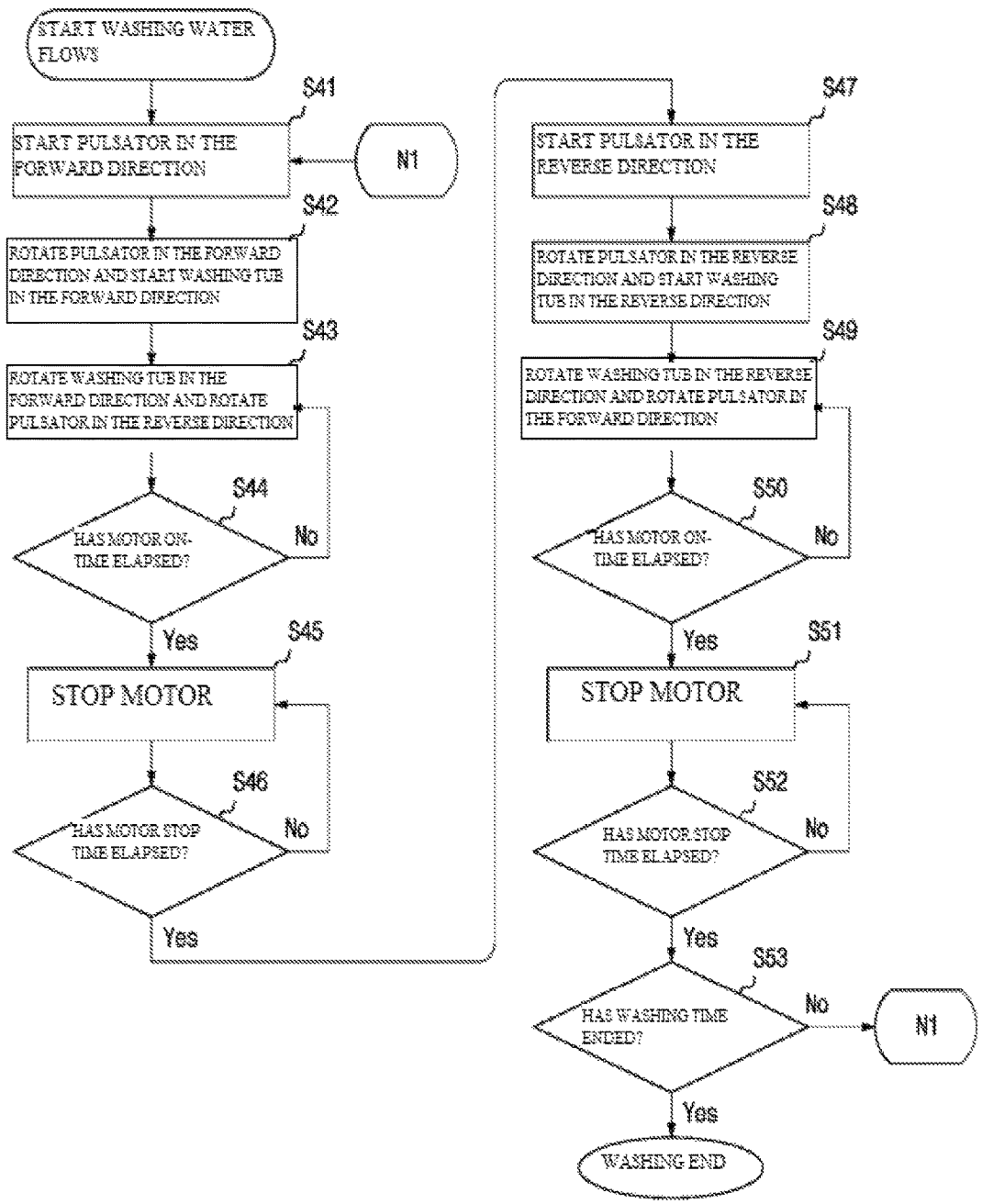
FIG. 13 is a flowchart illustrating a method of forming mutually opposite direction dual-power washing water flows by using an inertial force control according to the present invention.

FIG. 13 is a flowchart illustrating a method of forming mutually opposite direction dual-power washing water flows by using a control of the force of inertia according to an embodiment of the present invention, that is, a method of using a pulsator a large drive torque.

Referring to FIG. 13, first, the rotational force of the inner rotor is converted to a torque while passing through the planetary gear set 70 by rotating the inner rotor 40 in the forward direction, that is, in the clockwise (CW) direction, to thus start the pulsator 130 in the forward direction, that is, in the clockwise (CW) direction (S41).

Then, the outer rotor 50 is rotated in the forward direction, that is, in the clockwise (CW) direction in a state where the pulsator 130 is rotated in the forward direction, that is, in the clockwise (CW) direction, and reaches a preset RPM, to thus easily start the washing tub 120 requiring a large starting torque in the forward direction, that is, in the clockwise (CW) direction (S42).

That is, the pulsator 130 having the good starting torque is first rotated in a direction of rotation of the washing tub 120, and then the washing tub 120 is rotated with a time difference from rotation of the pulsator 130, to thereby easily start the washing tub 120.

Then, the pulsator 130 is rotated in the reverse direction by rotating the inner rotor 40 in the reverse direction in a state where the washing tub 120 is rotated in the forward direction or the clockwise (CW) direction (S43). As a result, strong water flows capable of enhancing a cleaning capability can be formed.

As described above, when the pulsator 130 having the good starting torque is first rotated in a direction of rotation of the washing tub 120, the starting torque of the washing tub 120 requiring a large starting torque is supplemented due to the laundry, to thereby easily start the washing tub 120, reduce the starting current, and reduce the power consumption.

Then, it is determined whether a preset time, that is, the motor on-time (ON TIME) of forward (CW) rotation of the washing tub 120 and the reverse rotation of the pulsator 130, has elapsed(S44).

As the determination result, when it is determined that the motor on-time (ON TIME) has elapsed, the process proceeds to step S45 to stop the inner and outer rotors 40 and 50, that is, the motor, to thus stop the motor, and then the process proceeds to step S46 to determine whether a preset motor stop time has elapsed.

As the determination result, when it is determined that the preset motor stop time has elapsed, the rotational force of the inner rotor is converted to a torque while passing through the planetary gear set 70 by rotating the inner rotor 40 in the reverse direction, that is, in the counterclockwise (CCW) direction, to thus start the pulsator 130 in the reverse direction, that is, in the counterclockwise (CCW) direction (S47).

Then, the outer rotor 50 is rotated in the reverse direction, that is, in the counterclockwise (CCW) direction in a state where the pulsator 130 is rotated in the reverse direction, that is, in the counterclockwise (CCW) direction, and reaches a preset RPM, to thus easily start the washing tub 120 in the reverse direction, that is, in the counterclockwise (CCW) direction (S48).

Then, the pulsator 130 is rotated in the forward direction by rotating the inner rotor 40 in the forward (CW) direction in a state where the washing tub 120 is rotated in the reverse direction, that is, in the counterclockwise (CCW) direction (S49).

Then, it is determined whether a preset time, that is, the motor on-time (ON TIME) of reverse (CCW) rotation of the washing tub 120 and the forward rotation of the pulsator 130, has elapsed (S50).

As the determination result, when it is determined that the motor on-time (ON TIME) has elapsed, the process proceeds to step S51 to stop the inner and outer rotors 40 and 50, that is, the motor, to thus stop the motor, and then the process proceeds to step S52 to determine whether a preset motor stop time has elapsed.

As the determination result, when it is determined that the preset motor stop time has elapsed, it is determined whether the washing time has ended (S53). When the washing time has ended, the washing stroke is finished and the process proceeds to the subsequent processing stroke, while when the washing time does not end, the process proceeds to step S41 to repeat the above procedures S41 to S53.

As described above, when the pulsator 130 having the good starting torque is first rotated in a direction of rotation of the washing tub 120, and then the washing tub 120 is rotated with a time difference from rotation of the pulsator 130, the laundry and the washing water inside the washing tub are already being rotated with the rotation of the pulsator, to accordingly easily start the washing tub 120 in accordance with the force of inertia of the laundry and the washing water.

The above-described embodiment provides a method of forming mutual opposite direction dual-power washing water flows that rotate the pulsator 130 in one direction after rotatably starting the washing tub 120 in the other direction by using the force of inertia of the laundry and the washing water, from which modifications can be made.

For example, after rotating the washing tub 120 and the pulsator 130 in an identical direction by rotating the inner rotor 40 and the outer rotor 50 in an identical direction, the pulsator 130 is easily started in the reverse (CCW) direction by rotating the inner rotor 40 in the reverse (CCW) direction in a state where the inner rotor 40 and the outer rotor 50 reach a preset RPM, to thereby form mutual opposite direction dual-power washing water flows.

Further, after rotating both the washing tub 120 and the pulsator 130 in an identical direction by rotating the inner rotor 40 and the outer rotor 50 in an identical direction, the outer rotor 50 to drive the washing tub 120 is stopped and the inner rotor 40 is rotated in the reverse direction and the pulsator 130 is rotated in the reverse (CCW) direction in a state where the inner rotor 40 and the outer rotor 50 reach a preset RPM, to thereby form mutual opposite direction dual-power washing water flows.

Figure 14:
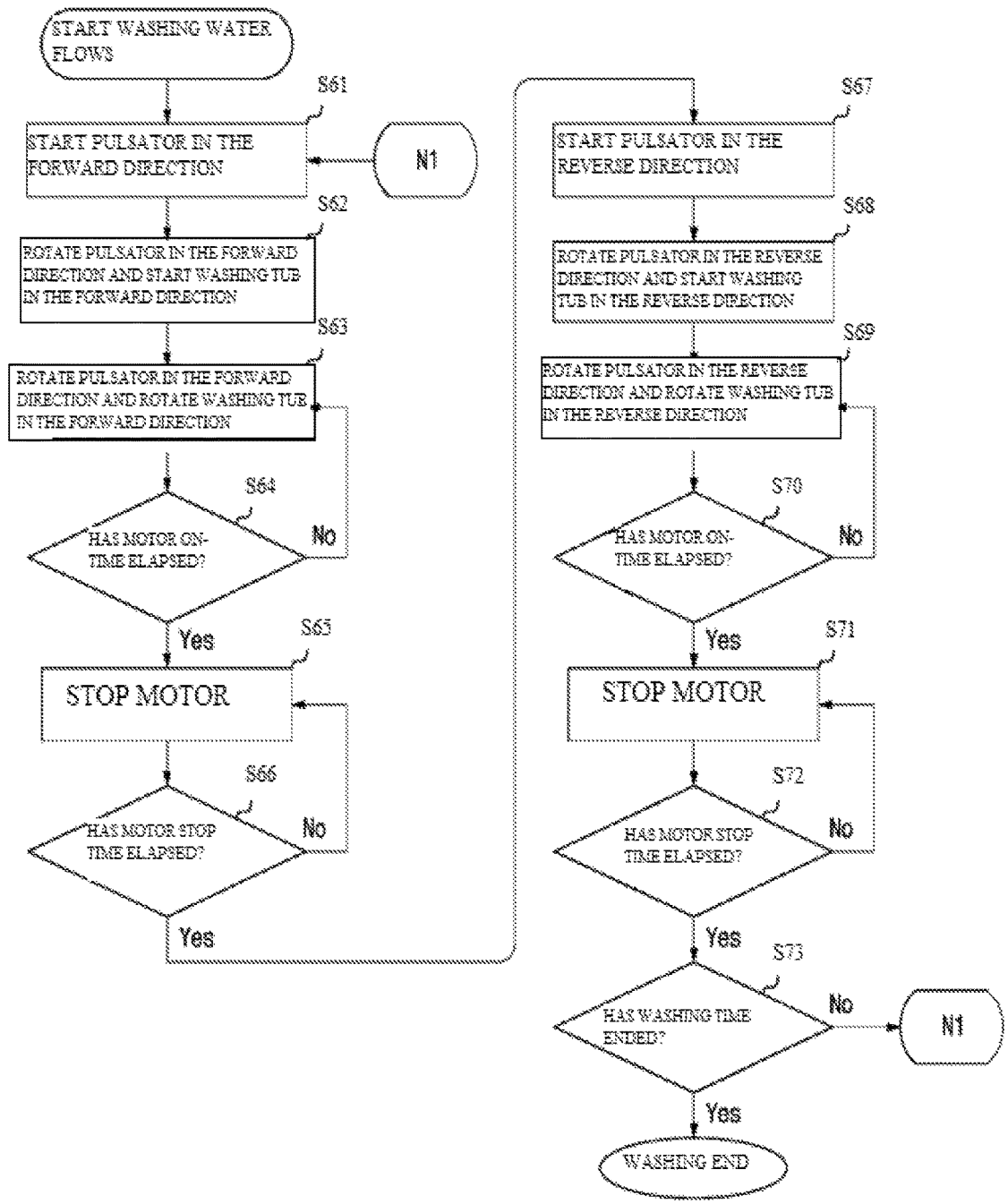
FIG. 14 is a flowchart illustrating a method of forming mutually identical direction dual-power washing water flows by using an inertial force control according to the present invention.

FIG. 14 is a flowchart illustrating a method of forming mutually identical direction dual-power washing water flows by using an inertial force control according to the present invention.

First, the rotational force of the inner rotor is converted to a torque while passing through the planetary gear set 70 by rotating the inner rotor 40 in the forward direction, that is, in the clockwise (CW) direction, to thus start the pulsator 130 in the forward direction, that is, in the clockwise (CW) direction (S61).

Then, the outer rotor 50 is rotated in the forward direction, that is, in the clockwise (CW) direction in a state where the pulsator 130 is rotated in the forward direction, that is, in the clockwise (CW) direction, and reaches a preset RPM, to thus easily start the washing tub 120 requiring a large starting torque in the forward direction, that is, in the clockwise (CW) direction (S62).

That is, the pulsator 130 having the good starting torque is first rotated in a direction of rotation of the washing tub 120, and then the washing tub 120 is rotated with a time difference from rotation of the pulsator 130, to thereby easily start the washing tub 120.

Then, both the washing tub 120 and the pulsator 130 are rotated in the forward direction, that is, in the clockwise (CW) direction (S63).

Then, it is determined whether a preset time, that is, the motor on-time (ON TIME) of forward (CW) rotation of the washing tub 120 and the pulsator 130, has elapsed (S64).

As the determination result, when it is determined that the motor on-time (ON TIME) has elapsed, the process proceeds to step S65 to stop the inner and outer rotors 40 and 50, that is, the motor, to thus stop the motor, and then the process proceeds to step S66 to determine whether a preset motor stop time has elapsed.

As the determination result, when it is determined that the preset motor stop time has elapsed, the rotational force of the inner rotor is converted to a torque while passing through the planetary gear set 70 by rotating the inner rotor 40 in the reverse direction, that is, in the counterclockwise (CCW) direction, to thus start the pulsator 130 in the reverse direction, that is, in the counterclockwise (CCW) direction (S67).

Then, the outer rotor 50 is rotated in the reverse direction, that is, in the counterclockwise (CCW) direction in a state where the pulsator 130 is rotated in the reverse direction, that is, in the counterclockwise (CCW) direction, and reaches a preset RPM, to thus easily start the washing tub 120 in the reverse direction, that is, in the counterclockwise (CCW) direction (S68).

Then, both the washing tub 120 and the pulsator 130 are rotated in the reverse direction, that is, in the counterclockwise (CCW) direction (S69).

Then, it is determined whether a preset time, that is, the motor on-time (ON TIME) of reverse (CCW) rotation of the washing tub 120 and the pulsator 130, has elapsed (S70).

As the determination result, when it is determined that the motor on-time (ON TIME) has elapsed, the process proceeds to step S71 to stop the inner and outer rotors 40 and 50, that is, the motor, to thus stop the motor, and then the process proceeds to step S72 to determine whether a preset motor stop time has elapsed.

As the determination result, when it is determined that the preset motor stop time has elapsed, it is determined whether the washing time has ended (S73). When the washing time has ended, the washing stroke is finished and the process proceeds to the subsequent processing stroke, while when the washing time does not end, the process proceeds to step S61 to repeat the above procedures S61 to S73.

As described above, the above-described embodiment provides a method of forming mutual identical direction dual-power washing water flows that easily rotate the washing tub 120 in one direction by using the force of inertia of the laundry and the washing water, by a time difference drive that rotates the pulsator 130 in advance in a direction of rotation of the washing tub 120, from which modifications can be made.

For example, the pulsator 130 and the washing tub 120 are softly started in an identical direction and at an identical speed, and are turned over left and right, while the pulsator 130 and the washing tub 120 are turned over rotationally and softly started, by detecting forming of a vortex, to thereby form vertical falling water flows and vertical rising water flows, and maintain a rotational force to generate a vortex to thus form soft water flows.

The soft water flows are applied, for example, when performing the washing by gently shaking the laundry such as wool. The soft water flows can be solved by using a method of, for example, shortening the on-time and lengthening the off-time.

The method of forming the soft water flows generates vertical water flows by switching the vortex in the reverse with a vortex detection function, to thus control washing and rinsing water flows and prevent damage to the laundry, and also expect a cleaning capability and a rinsing power against contamination of the laundry even on the soft water flows.

In addition, the washing water flow forming method can form a vortex to prevent damage to the laundry by driving the pulsator 130 and the washing tub 120 in an identical direction and at different speeds.

When the washing tub and the pulsator are respectively controlled to generate respectively different rotational forces in an identical direction, a twisting phenomenon of the laundry may occur due to a rotational difference between an upper vortex and a lower vortex, to thereby expect forming of water flows that enable enhancement of a cleaning capability and a rinsing power, but are similar to the soft water flows.

Moreover, when the pulsator 130 and the washing tub 120 are driven at variable speeds in a motor starting torque control section and a rotation maintenance section during forming the water flows by using the dual-power, dual rhythm water flows can be formed.

When the pulsator 130 and the washing tub 120 are controlled during forming the dual rhythm water flows while varying a rotational RPM at a constant speed control, less energy consumption can be pursued for authentication required for energy savings. In addition, when a combination of the water flows with different intensities is used instead of using a continuous strong water flow, for example, the water flows are mixedly used in sequence of strong->middle->weak->strong->middle->weak->strong water flows, a cleaning capability and a rinsing power can be enhanced with less energy.

In addition, the soft water flow forming method is a washing water flow forming method of allowing the pulsator 130 to rotate quicker or slower than the washing tub 120, when the pulsator 130 and the washing tub 120 are rotated in the forward direction.

A water flow forming method of rotating the pulsator 130 and the washing tub 120 identically by making the pulsator 130 and the washing tub 120 execute rapid acceleration in the forward direction in a normal start manner but in a soft start manner, can be applied as the washing water flow forming method according to an embodiment of the present invention.

The washing water flow forming method according to an embodiment of the present invention is useful for a micro-laundry cleaning method, and uses a soft start of a motor. As the pulsator 130 and the washing tub 120 are rotated in the reverse direction, the washing water flow forming method is configured so that the pulsator 130 and the washing tub 120 are softly started at an identical speed, and are rotated for long rotational time, to thereby reduce a motor start-up current of a small amount of laundry to prevent damage to the fabric.

An operation method according to a load in the method of forming the mutual opposite direction dual-power washing water flows according to an embodiment of the present invention will now be described below.

The inner rotor is rotated in the forward (CW) direction. That is, when a driving signal is applied to the first coil 66, the inner rotor 40 is rotated in the forward (CW) direction, and the first inner shaft 30 connected to the inner rotor 40 is rotated. Then, the rotational speed is decelerated by the planetary gear set 70 coupled to the first inner shaft 30, to then be transmitted to the second inner shaft 32, and the pulsator 130 associated with the second inner shaft 32 is rotated in the forward (CW) direction.

Meanwhile, when there is no laundry in the washing tub 120 or there is laundry less than a set value in the washing tub 120 (when there is no load or a small load influencing upon the pulsator 130), the ring gear 72 of the planetary gear set 70 performs a brake operation since the ring gear 72 is connected to the outer shafts 20 and 22 and the washing tub 120. Accordingly, the rotational force of the inner rotor 40 is input to the sun gear 74 and is output to the carrier 76. Thus, the pulsator 130 connected to the carrier 76 is rotated.

That is, when there is no laundry in the washing tub 120 or there is laundry less than a set value in the washing tub 120, the rotational force of the inner rotor 40 is transmitted to the pulsator 130, and thus the pulsator 130 is rotated.

Meanwhile, when a certain amount or more of the laundry is put inside the washing tub 120, a load is applied to the pulsator 130, and the carrier 76 connected to the pulsator 130 acts as a brake. Then, the rotational force of the inner rotor 40 is input to the sun gear 74 and is output to the ring gear 72, and thus the washing tub 120 and the outer rotor 50 associated with the ring gear 72 are rotated in the reverse (CCW) direction.

In some embodiments, the rotation and the rotational direction of the outer rotor 50 are determined in order to control the forward output (RPM) of the pulsator 130. That is, the control unit 500 determines the rotation and the rotational direction of the outer rotor 50 according to a signal applied from the first rotor position detection sensor 510 that is installed on one side of the outer rotor 50 or the ring gear 72 and that detects the RPM of the outer rotor 50.

The output of the pulsator 130 is accelerated or decelerated according to a direction of the rotational force of the outer rotor 50. That is, when the direction of rotation of the outer rotor 50 is the same as that of the inner rotor 40, the output of the pulsator 130 is decelerated, while the direction of rotation of the outer rotor 50 is opposite to that of the inner rotor 40, the output of the pulsator 130 is accelerated.

Here, when the RPM of the outer rotor 50 is less than a set value, the outer rotor 50 is rotated in the reverse (CCW) direction, while when the RPM of the outer rotor 50 is larger than or equals to the set value, an electromagnetic brake is used or the outer rotor 50 is rotated in the forward (CW) direction, to thus control the RPM of the outer rotor 50.

Then, the outer rotor 50 acts as a brake to thus transmit the rotation force of the inner rotor 40 to the pulsator 130 and rotate the pulsator 130 to thereby perform a washing stroke.

In addition, the RPM of the inner rotor 40 is adjusted. That is, the control unit 500 detects the RPM of the outer rotor 50, according to a signal applied from the first rotor position detection sensor 510, and detects the RPM of the inner rotor 40 according to a signal applied from the second rotor position detection sensor 520 that is installed on one side of the inner rotor 40 and that detects the RPM of the inner rotor 40, to thus increase the rotational speed of the inner rotor 40 according to the RPM of the outer rotor 50.

Meanwhile, the pulsator 130 is stopped to rotate the pulsator 130 in the reverse direction. In other words, when the brake action of the electromagnetic brake of the outer rotor 50 is released, the rotational force of the inner rotor 40 is transferred to the washing tub 120, and thus the washing tub 120 is rotated in the reverse direction and the pulsator 130 is stopped. When the inner rotor 40 is stopped in this state, the inner rotor 40 is stopped in a state where the fewer loads is applied, and thus the inner rotor can be stopped at a relatively low power.

Then, the pulsator 130 is rotated in the reverse (CCW) direction by rotating the inner rotor 40 in the reverse (CCW) direction.

The pulsator 130 is rotated in the reverse direction for a set time and is stopped again, to then be rotated in the forward direction for a set time, while the process is repeatedly conducted in sequence as described above.

In this way, the washing machine according to one or more embodiments of the present invention can reduce the starting current, thereby reducing the power consumption, since the rotational force of the inner rotor 40 is transmitted to the washing tub 120 and thus the inner rotor 40 is in a substantially no-load state, in the case that the laundry is introduced into the washing tub 120 and thus the pulsator 130 is under load conditions when the inner rotor 40 is started early.

Further, the washing machine according to one or more embodiments of the present invention can reduce the end current, thereby reducing the power consumption, since the electromagnetic brake of the outer rotor is released and the inner rotor 40 is stopped in a state where the pulsator 130 is first stopped, and thus the inner rotor 40 is stopped in a state where the moment of inertia becomes small, in order to stop the inner rotor 4.

Figure 8:
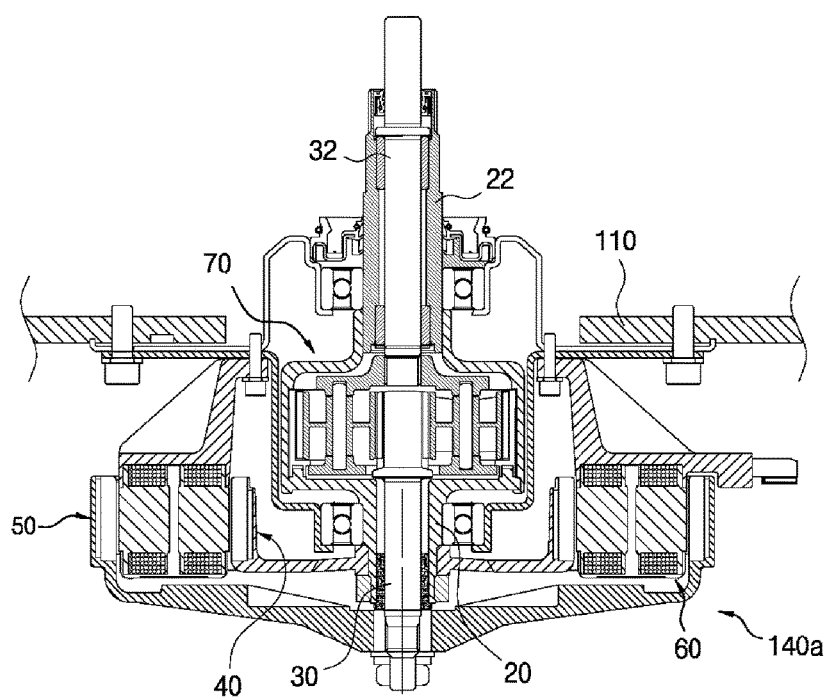
FIG. 8 is an axial cross-sectional view of a washing machine motor according to a second embodiment of the present invention.

The above-described embodiment has been described with respect to the washing method using the washing machine motor 140 according to the first embodiment, but the above-described embodiment of the present invention can be applied identically for a washing method using the washing machine motor 140a according to the second embodiment shown in FIG. 8.

The above-described embodiment employs a structure that the washing machine motor 140 or 140a is provided with the planetary gear set 70 and decelerates the output of the inner rotor 40 to then be delivered to the pulsator 130, but most of the washing water flow forming method according to the above-described embodiment of the present invention can be applied identically for a structure excluding the planetary gear set 70 from the washing machine motor 140 or 140a.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention can be applied to a washing machine and a control method thereof, particularly to a full-automatic washing machine, in which a washing tub and a pulsator are separately driven to thereby form a variety of washing water flows.

The invention claimed is:

1. An apparatus for driving a washing machine, the apparatus comprising:
   an outer rotor;
   an inner rotor;
   a double stator including a stator core, wherein the stator core is formed of a first teeth portion around which a first coil is wound, a second teeth portion around which a second coil is wound, and a partition integrally formed with and between the first teeth portion and the second teeth portion, and wherein the first teeth portion faces the inner rotor with an air gap to drive the inner rotor, the second teeth portion faces the outer rotor with an air gap to drive the outer rotor independently from the inner rotor;
   a first cylindrical outer shaft connected to the outer rotor;
   a second cylindrical outer shaft connected to a washing tub;
   a first inner shaft rotatably disposed inside the first cylindrical shaft and connected to the inner rotor;
   a second inner shaft rotatably disposed inside the second cylindrical shaft and connected to a pulsator inside the washing tub; and
   a planetary gear set comprising: a ring gear fixedly coupled to the first cylindrical outer shaft and the second cylindrical outer shaft; a sun gear fixedly coupled to the first inner shaft; a plurality of planetary gears rotatably engaged with an outer surface of the sun gear and an inner surface of the ring gear; and a carrier coupled to the second inner shaft and rotatably supporting the planetary gears; and
   first and second bearings that are provided at the first cylindrical outer shaft and the second cylindrical outer shaft, respectively,
   wherein the planetary gear set is configured in such a way that, when a rotational force from the inner rotor is applied to the sun gear through the first inner shaft, a rotational speed of the inner rotor is decelerated through the planetary gears and the rotational force from the inner rotor is transmitted to the pulsator through the carrier and the second inner shaft with a decelerated rotational speed; and, when a rotational force from the outer rotor is applied to the ring gear through the first cylindrical outer shaft, a rotational speed of the outer rotor is not decelerated and the rotational force from the outer rotor is transmitted to the washing tub through the ring gear and the second cylindrical outer shaft, thereby being able to rotate the pulsator and the washing tub in the decelerated speed and the non-decelerated speed, respectively, and in opposite directions to each other, and drive the washing tub requiring a starting torque larger than that of the pulsator by ouput of the outer rotor providing a toque higher than that of the inner rotor.

2. The washing machine driving apparatus of claim 1, further comprising a control device that applies a first drive signal and a second drive signal to the first coil and the second coil independently,
   wherein the control device comprises: a first driver that controls the first drive signal applied to the first coil; a second driver that controls the second drive signal applied to the second coil; and a control unit for controlling the first driver and the second driver, and
   wherein the control device detects a rotational speed of the ring gear of the planetary gear set to thereby control a rotational speed of the pulsator.

\* \* \* \* \*